United States Patent
Ceulemans et al.

(10) Patent No.: US 9,000,073 B2
(45) Date of Patent: Apr. 7, 2015

(54) ADHESIVE COMPOSITION

(75) Inventors: Philippe Ceulemans, Turnhout (BE); Olivier Ceulemans, Oud Turnhout (BE); Jean Louis Blomme, Halluin (FR)

(73) Assignee: C-IP S.A., Luxembourg (LU)

( * ) Notice: Subject to any disclaimer, the term of this patent is extended or adjusted under 35 U.S.C. 154(b) by 203 days.

(21) Appl. No.: 13/522,729

(22) PCT Filed: Jan. 12, 2011

(86) PCT No.: PCT/EP2011/050341
§ 371 (c)(1),
(2), (4) Date: Jul. 18, 2012

(87) PCT Pub. No.: WO2011/089053
PCT Pub. Date: Jul. 28, 2011

(65) Prior Publication Data
US 2012/0289628 A1    Nov. 15, 2012

(30) Foreign Application Priority Data

Jan. 19, 2010  (BE) .................................. 2010/0028
Jul. 20, 2010  (EP) .................................. 10170187.8
Sep. 17, 2010  (EP) .................................. 10177355.4

(51) Int. Cl.
*C08L 3/00* (2006.01)
*C09J 103/02* (2006.01)
*C08L 33/02* (2006.01)
*C09J 129/04* (2006.01)

(52) U.S. Cl.
CPC ............... *C09J 103/02* (2013.01); *C08L 33/02* (2013.01); *C09J 129/04* (2013.01)

(58) Field of Classification Search
CPC ....... C08L 33/02; C09J 103/02; C09J 129/04; C08K 3/26; C08K 3/38
USPC ............................... 524/35, 47, 48, 405, 503
See application file for complete search history.

(56) References Cited

FOREIGN PATENT DOCUMENTS

WO   WO01/85866   11/2001

*Primary Examiner* — Edward Cain
(74) *Attorney, Agent, or Firm* — Jerold I. Schneider; Schneider Rothman IP Law Group (57) ABSTRACT

An adhesive composition including at least 7% and at most 30% by weight of adhesive component, which adhesive component includes at least one polyvinyl alcohol and/or at least one dextrin and/or at least one starch, further including a carbomer and optionally a boron compound, wherein the pH of the composition is at most 13.0 and, if starch and the boron compound are present, more than 91.0% of all the starches in the composition are in a cold water insoluble form. Further provided are a solid dry premix suitable as the basis for the adhesive composition, and processes for preparing the solid dry premix, or the adhesive composition, and articles wherein any of these are employed to form an adhesive bond with a substrate.

33 Claims, 3 Drawing Sheets

ADHESIVE COMPOSITION

CROSS-REFERENCE TO RELATED APPLICATIONS

This application is the entry into the United States of PCT Application Number PCT/EP2011/050341, filed Jan. 12, 2011 and claims priority from Belgian Patent Application No. 2010/0028 filed Jan. 19, 2010, European Patent Application No. 10170187.8 filed Jul. 20, 2010, and European Patent Application No. 10177355.4 filed Sep. 17, 2010, the entirety of each of which are hereby incorporated by reference.

FIELD OF THE INVENTION

The present invention relates to adhesive compositions which find their prime uses in the paper and cardboard industry. Such adhesive compositions are very often primarily based on a natural polymeric product, most typically starch and/or dextrin, but may also be based partly or entirely on a suitable synthetic adhesive polymer, such as a polyvinyl alcohol. The invention is particularly concerned with adhesives which may be used in contact with foodstuffs, and may even be used as part of foods. The present invention is further concerned with the production and the uses of such adhesive compositions.

BACKGROUND OF THE INVENTION

Starch based adhesive compositions, and the natural and synthetic alternatives thereof, find many industrial uses, such as in the industry producing corrugated box board, paper bags, paper boxes, in carton sealing or case sealing, in bookbinding or tube winding, in wallpaper adhesives, in the production of laminated paper board, gummed tape or paper, envelope adhesives, school glues, bottle labelling and in textile sizing.

Starch or amylum is a natural polymeric material which is found in almost every plant, a carbohydrate consisting of a large number of glucose units. It is produced by all green plants as an energy store, for storing their glucose as a polysaccharide polymer, which is a water insoluble and much more compact form than glucose. It consists of two types of molecules: the linear and helical amylase and the branched amylopectin. Starch molecules arrange themselves in the plant in semi-crystalline granules, and each plant species has a unique starch granular size. Pure starch is a powder which is insoluble in cold water, but which may convert to a water soluble form when heated.

Many plants may be dried and milled or ground to obtain a starch-containing flour. This is a dry, simple and inexpensive process, and which leads to a flour containing starch together with other components, such as usually gluten and fiber. Starch in higher purity on the other hand is typically produced by a wet and more complex process, whereby a natural product such as corn is usually first softened to break the bonds between the individual components of the kernel, also called the steeping process, followed by wet milling or grinding, washing and screening or sieving to separate the other component parts in relatively high purity. Corn processing for instance leads to the so-called steepwater, containing all the water solubles, and further washing and separation leads to the starch, separated from the germ, the fiber and the gluten as co-products. The germ, gluten and fibers are dewatered and dried by use of filters, presses and dryers. The germ is usually further processed to recover corn oil, while the remaining fiber is typically returned for animal feed.

For the production of industrial and food starches, starch slurry from the washing and separation steps is usually dewatered in centrifuges to produce a starch "cake", which is then dispersed into a stream of heated air, and flash dried to the desired water content of about 10%. Great care must be taken to prevent the starch from overheating in the presence of moisture, because of the risk for gelation to start, and such a product may also exhibit an undesirably high sensitivity to caustic soda.

Today the principal sources of commercial starches are corn or maize, potato, tapioca and wheat, but also rice, sweet potato, sago, arrowroot and mung bean are used commercially.

The quality of a starch product depends on its starting material, and as with any natural raw material, the properties of a harvested plant may be affected by many factors, such as temperature, hours of sunlight, humidity, rainfall, year of planting, soil moisture, plant population and fertilization rate.

The chemical makeup of the starch polymer makes it a good adhesive, a property which has been known and used since ancient history. Raw, untreated or ungelatinized starch, also labeled "pearl" starch, does not dissolve in cold water, i.e. in water at or below ambient temperature. The starch only becomes soluble in water when heated. In heated water, the granules swell and burst, the semi-crystalline structure is lost and the smaller amylase molecules start leaching out of the granule, forming a network which holds water and increasing the mixture's viscosity.

This transformation of the starch granule is called gelatinization. The gelatinization temperature, or gel temperature, of a starch in water is the temperature at which the mixture begins to thicken and to develop its bonding properties. Although it is often expressed as a single temperature unit, in reality it is a temperature range, dependent on the molecular size and composition of the starch, and hence strongly raw material dependent. The gel point of a starch in the adhesive industry is very important, as it sets the temperature required for the applied adhesive to gelatinize and to perform its bonding function after evaporation of the excess water.

For modern industrial applications however, with corrugating machines running at speeds in excess of 300 m/min, starch itself is too slow in developing its adhesive properties, i.e. its "tack", and also its viscosity in water is too low. The "gelatinization point" of a pearl starch is typically 77° C. or higher. It is known that the gelatinization temperature of a starch may be reduced, for instance by the addition of a base. Sufficient amount of a strong base, such as caustic soda or soda ash, may even fully gelatinize starch at ambient temperature or below, and convert it into a cold water soluble form. Industrial starch-based adhesives are therefore made rather strongly basic. For gel point reduction, a need which is driven by reduced energy requirements and faster processing speeds, the starch-based adhesive therefore typically has a pH of at least 12.2 or above, and in many instances the pH may be above 13.0. The conventional starch adhesive therefore typically contains a high amount of free base, usually NaOH.

Starch may be pre-cooked, or pregelatinized and subsequently dried, such that it may be used to thicken instantly in cold water. Starch may be chemically modified to allow the starch to function properly under conditions frequently encountered during processing or storage, such as high heat, high shear, low pH, freeze/thaw and cooling. Typical modified starches for technical applications are cationic starches, hydroxyethyl starch and carboxymethylated starches.

The prime non-food application for starches is their use in the paper and corrugated cardboard industry, together consuming millions of metric tons of starch annually. Nearly all of the corrugated board produced today is bonded with a starch-based adhesive, primarily using unmodified native starches. An aqueous and raw starch-containing adhesive composition is applied onto the paper or cardboard surface, the water migrates into the porosity of the paper or cardboard and entrains the starch granules, which by applying heat and pressure, and assisted by the presence of a base, swell and gelatinize and act as a fast and strong adhesive by forming the network required for providing the desired bonding. Excess water, i.e. the water not absorbed by the starch granules, is then typically removed by vaporisation.

An adhesive containing only pearl starch, water and some caustic soda is too low in viscosity for a good application of the adhesive. Various methods have been developed to increase the viscosity.

The conventional method is the Stein-Hall method wherein separately a "carrier" is produced. For this purpose, typically 15-20% of the (primary) starch is heated in the presence of a significant amount of (primary) water and caustic soda to form a viscous liquid or paste. This viscous carrier of gelatinized starch is then used as the basis for suspending the typically 80-85% secondary amount of pearl starch in water complemented with an additional, i.e. a secondary, amount of water, to form the target adhesive composition. The viscosity of this aqueous adhesive composition is primarily set by the amount and the viscosity of the carrier used in the final adhesive formulation. Usually a small amount of a boron compound, most frequently borax, a product chemically known as di-sodium tetraborate decahydrate, is finally added, primarily for buffering the caustic soda. The anion structure of the borax builds further interchain linkages between the already gelatinized starch polymer molecules, thereby further increasing the viscosity of the adhesive composition. The pH of a typical Stein-Hall adhesive is about 12.5, but may sometimes be as high as 13.1.

There exist variants to the Stein-Hall process. The borax may for instance be added to the carrier, before mixing in the secondary starch and additional water, optionally already prepared in parallel as a secondary mixture, such as for instance described in JP 45020598 B4 or in JP45019600 B4. In the so-called "Roquette" or "Primsteam" process, only heat and no base is used in the production of the carrier. Caustic soda is added only in the secondary step, in order to reduce the gel point of the pearl starch in the final adhesive. This process has the disadvantage that the viscosity of the final adhesive is more difficult to control. In the "Minocar" process, the carrier forming step is monitored by closely controlling its viscosity during production. When the desired viscosity is reached, further gelatinization is stopped by adding extra water, extra starch and borax. In the Jet Cook process, all the water, half of the starch, and the required caustic soda and borax to give the desired final gel temperature of the adhesive are mixed together, and live steam is injected to swell at least part of the starch until a given viscosity is reached. Upon reaching the target, the remainder of the pearl starch is added under further mixing to form the final adhesive. In the so-called "No-carrier" process, all the starch, water, 50% caustic solution and boric acid are mixed together and used to "swell" the starch granule under well-controlled heat input. This causes a partial gelatinization of the starch present in the mixture, a process which needs to be tightly controlled to provide the desired viscosity of the formed adhesive composition.

All these processes suffer from various disadvantages. Most importantly, only the pearl starch in the adhesive is available for bonding the paper or cardboard. The amount of primary starch used for raising the viscosity, such as in producing the carrier, and which usually amounts to about 15% of the total starch, is already gelatinized before the adhesive is applied. It is thus not anymore available to participate in the desired bonding function. This means that typically about 15% of the total starch used is not used as adhesive, but only as a viscosity modifier.

Furthermore, the gel point and viscosity of gelatinized starch in water vary from crop to crop, even of the same plant. This means that the process using the starch-based adhesive needs to be adjusted with any variation in the origin of the supplied starch.

Viscosity of the adhesive is however also a very important process parameter in the corrugating industry. With too low viscosity, the water tends to "wick" into the medium, i.e. diffuse away from the glue line and the pearl starch may not have sufficient water left to gelatinize completely, and hence not reach its full bonding properties. This may produce dry and brittle board coming off the corrugator, and which may fail the adhesion test. With too high viscosity, on the other hand, its penetration into the medium becomes too slow, leading to wide glue lines and thick bonds, thus to adhesive overconsumption, and also to overflow of the glue pans.

Another problem is that the viscosity of the adhesive composition, as primarily provided by the gelatinized starch in combination with the boron compound, is not stable. Viscosity is very temperature dependent. Tight temperature control of the adhesive composition is therefore required during its application and also in storage. The adhesive inventory may have to be reheated after a period of downtime, which has to be done carefully and thus is time consuming. Shear, such as it occurs at mixers, pumps, pipes, elbows or valves, at the corrugator and in the return lines to the adhesive inventory tank, breaks down the structure of the adhesive, and/or even more importantly of the gelatinised starch in its carrier, and this reduces the viscosity of the adhesive irreversibly. Therefore, where shear is inevitably applied, this shear must be applied and administered carefully. Production lines may be hundreds of meters long, and the adhesive may therefore need to be pumped, from a centralised "Glue kitchen" where it is prepared, over a distance of hundreds of meters to the point in the production line where it is to be applied. These transfer systems often comprise return lines for the adhesive as well. Pumps should be carefully selected and properly designed. The viscosity of a starch-based adhesive is also not constant over time, as the raw portion of the adhesive will begin to separate from the cooked portion, causing the viscosity to drop. Also gel temperature will rise the longer the adhesive is held in storage, because of a slow adsorption of free caustic into the starch. Fast turnover of the adhesive and limited inventory during down periods are therefore advised.

Another problem is a phenomenon called "spinning". When the adhesive is applied to the tops of the corrugations or flutes and the corrugated substrate separates from the applicator roll, the adhesive forms threads before breaking up. When these threads break and the adhesive jumps back to the substrate, a part of it typically ends up away from the desired location, called the "glue line". This part does not participate in the desired bonding function. More adhesive must therefore be applied, which increases the consumption and also the energy requirements of the process, as well as the risk for undesired temperature effects. The extra adhesive also increases the risk for malformation, in particular with thin substrates.

WO 2005/007765 A2 discloses Stein-Hall starch-based adhesive compositions further comprising small amounts of a cross-linked polyacrylate polymer additive with the prime purpose to improve the rheology of the adhesive composition, such that the viscosity of the adhesive changes with shear forces applied to it. In one example, an amount of primary starch and an amount of primary water are first mixed to obtain a primary starch mixture containing 10.7% wt of starch. This mixture needs to be stirred in order to avoid settling of the starch. Into this mixture the additive, as well as sodium hydroxide, secondary water, secondary starch and borax are added, and the result is again stirred. The resulting mixture contains 31.14% by weight of starch, based on the total adhesive composition. In another example, the additive is first mixed with water. Subsequently corn starch is added to a concentration of about 6.2% wt, The mixture is heated to 40° C. and a significant amount of caustic soda is added and mixed again, which causes the available starch to fully gelatinize. Thereafter water, pearl starch and borax are mixed in, providing an adhesive composition in which only 90.8% of all the starch present is non-gelatinized. WO 2005/007765 A2 further discloses solid pre-mixes comprising the additive, to which an amount of water may be added to prepare an adhesive. In these solid pre-mixes, at most 90.9% of all starch present is non-gelatinized. Apart from the addition of the additive, WO 2005/007765 A2 teaches to keep the nature of the adhesive composition virtually unaffected, as well as its solids content and gelling properties, due to the importance thereof when processing the composition.

FR 2890394 discloses the preparation of a Stein-Hall adhesive whereby first an adjuvant is prepared having a boron content of about 10% wt, and further comprising 0.1% by weight of sodium polyacrylate (Norasol LMW 45N). The adjuvant is added to the Stein-Hall adhesive in an amount of 0.345% wt, leading to a concentration of less than 3.5 ppm wt of the sodium polyacrylate in the adhesive. In FR2890394, 10.98% of all the starch present in the adhesive composition is gelatinized.

In the processes disclosed in JP 45020598B4, first a primary paste is made, typically containing 4.13% wt gelatinised starch, 0.86% wt of caustic soda and 0.85% borax in water. In example 2, the primary paste is a mixture of 4.72% wt sodium polyacrylate and 0.86% wt NaOH in water. Also prepared are secondary mixtures containing more than 32% wt or more of adhesive components in water. These mixtures are too rich to be suitable by themselves as adhesive. In these secondary mixtures, sodium polyacrylate and starch are used as the adhesive components, in weight ratios which vary from 0/10 to 10/0. The secondary mixtures are subsequently mixed together with the paste, to obtain an adhesive composition in which at least almost 12.5% or more of the starch is gelatinized. In Example 2, the secondary mixture contains starch only. The polyacrylate, in the ratios and concentrations used, was found to bring an effect of water resistancy when used in combination with starch. Without starch, the adhesive force was reported zero. All the pastes in JP 45020598B4 contain 0.86% wt of NaOH as gelatinizing agent and for gel point reduction of the ungelatinized starch, and which leads to the pH of the resulting adhesive compositions being 13.1 or above. The gel points of the adhesives in JP 45020598B4 were not measured.

The gelatinized part of the starch in the state of the art adhesive compositions is also susceptible to microbiological degradation. The gelled starch is prime food for bacteria, and, when attacked, is converted to soluble carbohydrate, which reduces viscosity and may even develop odour. Biocides may be used, but regular cleaning of the installation and change of biocide type is advised, in order to reduce breeding grounds and biocide resistance.

Also polyvinyl alcohols are used as adhesive components in adhesive composition, optionally in combination with other adhesive components such as a starch and/or a dextrin.

Another type of adhesives employ dextrin as one of, or as the sole adhesive components. Dextrins are a group of low molecular weight carbohydrates obtainable by the hydrolysis of starch. Dextrins are polysaccharides formed by heating dry or acid-modified starches in a process called pyrolysis. They can be used at higher solids levels than native or modified starches, creating stronger bonds, more tack and faster-drying properties than pastes made from unmodified starch. Dextrin pastes provide excellent machineability and also can be used in adhesives and coatings which come in contact with food products.

Frequently dextrin adhesives, as starch based adhesives are formulated with boron compounds such as borax (short for sodium tetraborate) to obtain high tack at moderate concentrations and viscosities with good aging characteristics. They also have good adhesion and machining properties. The borax is generally added in amounts of up to 10% based on dry starch or dextrin. Sodium hydroxide is also added to convert the borax to more active sodium metaborate. Applications include case sealing, carton sealing, bag seams, tube winding, and laminating.

Laminated corrugated board is a multilayer material in which one or both of the top and bottom side of a corrugated cardboard core are adhered to a sheet of flat board or paper, usually called the liner. An adhesive layer is applied to the top of the corrugations or flutes, following which the tops of the corrugations are adhered to the paper sheet.

The first addition of a flat paper liner to a corrugated medium of flutes is called the "single face" step, occurring at the "single facer" and producing the "single facer web". Providing a flat liner to the opposite side of the medium is called the "double backer" step, occurring at the "double backing" station. Adding a second corrugated medium of flutes as the next layer is called the "double facing" step. This may continue up to 3, 4 and 5 layers, depending on the purpose of the corrugated cardboard. Many weights, thicknesses and combinations of liners and medium are used for different applications. However, the principles of manufacture remain the same.

In an adhesive composition containing at least one polyvinyl alcohols as the adhesive component, boron components such as borax are often added to the composition in order to improve the tack and/or of the so-called spin or spinning behaviour and associated problems, as explained above, of the composition.

A problem with the Stein-Hall process, and its known variants, but thus also with many other adhesive preparation processes which do not use starch, but for instance are based on dextrin or on polyvinyl alcohols, is that the properties of the adhesive as desired in these different corrugating process steps typically differ, and that each step or material used desires an adhesive having its own particular gel point, its own dry matter content, and also its own particular viscosity and overall rheology behaviour. Each of these process steps may be provided with their own adhesive inventory, which is usually kept relatively small in view of the limited shelf life of the adhesive, but the typically common adhesive preparation step, usually performed in a common "Glue kitchen", needs to adapt its recipe each time to the needs of the particular downstream consuming process part. This adds significant complexity to the overall corrugating process.

Another problem with the known adhesives is that they often contain boron compounds, especially in combination with starch and/or polyvinyl alcohols, but also in combination with dextrins, and in combination with starch and/or dextrins also a significant free amount of a strong base. Because of toxicity concerns, the presence of boron compounds has recently become less desirable, in particular for adhesives which may be used in food contact applications. Also the presence of the strong base, such as caustic soda, has become undesirable. These strong bases are aggressive towards many construction materials. Their presence demands for less common construction materials, which adds complexity and investment costs to the process. Strong bases are also aggressive to skin, and therefore demand more complex procedures for the safety of the personnel operating the processes. In some geographies therefore, the use of strong bases, such as used in the high pH streams of the adhesive and cardboard industry, is becoming more and more regulated, and may even one day become prohibited. There is therefore a growing need for adhesive compositions having a lower boron content, preferably being free of boron and/or having a lower pH, ideally being about pH neutral.

There therefore remains a need for an adhesive composition which is easy to prepare, of which the viscosity may be easy to predict and control, which makes more effective use of the starch employed in its preparation, which exhibits the non-newtonian rheology behaviour preferred in the corrugating process, and which contain less strong base. Preferably, such adhesive composition would also contain less boron, more preferably be free at least one of these less desired ingredients.

The present invention aims to obviate or at least mitigate the above described problem and/or to provide improvements generally.

SUMMARY OF THE INVENTION

According to the invention, there is provided an improved adhesive composition, a solid pre-mix suitable to provide the improved adhesive composition, and processes for the production of the pre-mix and of the adhesive composition, as defined in any of the accompanying claims.

The invention provides an aqueous adhesive composition comprising at least 7% and at most 30% by weight, based on the total adhesive composition, of adhesive component, the adhesive component comprising at least one polyvinyl alcohol and/or at least one dextrin and/or at least one starch, the adhesive composition further comprising a carbomer and optionally a boron compound, characterized in that the adhesive composition has a pH of at most 13.0 and that, if starch and the boron compound are present in the adhesive composition, more than 91.0% of all the starches in the composition are in a cold water insoluble form.

The applicants have found that the carbomer present in the adhesive composition according to the present invention, even in low concentrations, is a strong contributor for building viscosity, and also a strong contributor in reducing the gel point of starch and/or dextrin, such that the composition is readily suitable for the corrugating process without needing the additional cross-linking effect of a boron compound and/or with a lower amount of gelatinized starch and/or dextrin, as well as needing less caustic soda for gel point reduction and thus not requiring a high pH. This reduces, and possibly avoids the need for gelatinizing a significant part of the starch only for building viscosity, such as for the conventional Stein-Hall adhesive or one of its known variants. More, if not all, of the starch and/or dextrin present in the adhesive remains thus available for participating in the bonding function, and the composition thus represents a more effective use of the starch. It also reduces the caustic soda need and opens the possibility to have a substantially boron-free adhesive composition.

The applicants have found that the carbomer itself may affect and reduce the gel point of starch and/or dextrin, such that less base may be required to obtain a desired gel point reduction. This brings the advantage that less or no free base may be present in the composition. The applicants have further found that the carbomer reduces the gel point of the starch and/or dextrin sufficiently to make the adhesive composition by itself suitable for application, such that the addition of caustic soda may not be anymore required. The applicants have further found that also the addition of a boron compound, such as borax, is not anymore required and may also be dispensed with. The adhesive composition according to the present invention may thus be substantially free of free strong base or free caustic soda, and/or may be substantially free of any boron containing compounds, such as borax. This brings the advantage that the invention may provide an adhesive composition which may be used without raising any of the recent toxicity and/or industrial hygiene concerns associated with boron, borax and/or caustic soda.

In combination with polyvinyl alcohol based adhesives, the applicants have found that the carbomer also provides the effect of improving the tack and/or the spin of the adhesive composition, and that the use of boron components therefore becomes less or not anymore desirable and may optionally be dispensed with. The present invention therefore provides also for an adhesive composition containing polyvinyl alcohol causing less spinning problems and which may possibly be free of boron containing compounds such as borax.

The applicants have further found, when starch and polyvinyl alcohols are both present in the composition according to the present invention, that the biological degradation of the composition is improved.

The applicants have found that the carbomer brings the same effect as boron to any dextrin adhesive component in the composition, and that therefore the boron concentration in the adhesive composition may be reduced, up to the point that the composition may be boron free. At the same time the amount of strong base, such as caustic soda, in the adhesive composition may be reduced, and possibly up to the point where little to no free strong base is required anymore, thanks to the presence of the carbomer.

A further advantage is that the viscosity of the adhesive according to the present invention is readily predictable by setting the concentration of the carbomer. The viscosity is also readily adjustable and correctable, upwards by adding more carbomer, and downwards by adding more water. This brings significant simplifications when one adhesive preparation step needs to supply different downstream users requiring adhesives with different physical properties.

The viscosity of the adhesive composition according to the present invention is also more stable over time and degrades less upon exposure of the adhesive composition to shear and/or microbiological attack. In addition, the adhesive composition according to the present invention exhibits non-newtonian rheology behaviour, which is so desired in the application process, bringing the advantage of a low viscosity under high shear, such as between the applicator roll and the doctor roll in the application process, and of a high viscosity under low shear, such as when the corrugated substrate separates from the applicator roll. The applicants have found that the "spinning" phenomenon may be entirely avoided. This brings the advantage that a more effective use of adhesive is possible, a reduction in the energy needs of the process in terms of mechanical and heating energy, and also brings the possibility to process thinner substrates and to operate the process at higher processing speeds.

In another embodiment, the present invention provides for a solid pre-mix comprising (i) an adhesive component, preferably in the powder form, comprising as adhesive component at least one polyvinyl alcohol and/or at least one dextrin and/or at least one starch, (ii) a carbomer, preferably also in the powder form, and (iii) a base, optionally in the liquid form but preferably also in the powder form, preferably the base being sodium (bi)carbonate or sodium hydroxide, characterized in that, if starch is present in the composition, more than 91.0% of all the starches in the composition are in a cold water insoluble form. The composition of the premix is such that, when the premix is mixed with an amount of water suitable to provide an aqueous composition comprising from 7.0 to 30.0% by weight, based on the total adhesive composition, of adhesive component, the aqueous adhesive composition obtained is an aqueous adhesive composition according to the present invention, in particular with respect to the relative ratios of the individual components, such as carbomer and base, relative to the total amount of adhesive component.

The pre-mix represents a possible and suitable intermediate for producing the adhesive composition of the present invention, and therefore also brings the advantages listed above.

In a further embodiment, the present invention provides a process for the production of an aqueous adhesive composition according to the present invention comprising the steps of
a) optionally forming a first carrier by mixing a primary amount of starch into a primary amount of water and at least partly gelatinizing this primary starch by means of the addition of heat and/or a base,
b) optionally dissolving the carbomer in a secondary amount of water to form a second carrier,
c) optionally neutralizing, in the absence of any starch, the second carrier from step b) to the desired pH by mixing in a base, preferably by mixing in sodium hydroxide or a solution thereof, to form a third carrier,
d) mixing a tertiary amount of water, the adhesive component, and any further ingredient as required, into the first carrier from step a), the second carrier from step b), and/or the third carrier from step c) as required to form the aqueous adhesive composition.

The process according to the present invention offers the advantage that the product viscosity is readily controlled and predictable by setting or adjusting the amount of carbomer and water used in the various process steps, and may be readily adjusted to the requirements of any downstream step for which the product is intended. Further advantages are that the viscosity of the product produced is more stable over time, and that the amount of adhesive component in the composition may also be independently controlled and adjusted to the specific downstream requirement.

In another embodiment, the invention may provide a suspension of a boron containing compound in water containing a carbomer. The carbomer is preferably present in an amount sufficient to keep the boron containing compound in suspension, and to keep the suspension stable over a long period of time.

DETAILED DESCRIPTION OF THE INVENTION

In the context of the present invention, the adhesive component comprises all the starch present in the composition, including any gelatinised starch if any of such starch is present.

The adhesive composition according to the present invention may comprise at least one further adhesive component selected from the group consisting of starch, polyvinyl alcohol, ethylene vinyl acetate (EVA) copolymer, dextrine, a polyurethane adhesive. The composition may further comprise also an adhesion promoter, which in the context of the present invention is considered as an additional adhesive component.

In an embodiment, the adhesive composition according to the present invention comprises at most 29.5% wt, based on the total adhesive composition, of adhesive components, preferably at most 29.0% wt, more preferably at most 28.5% wt, even more preferably at most 28.0% wt, yet more preferably at most 27.5% wt, more preferably at most 27.0% wt, even more preferably at most 26.5% wt, yet more preferably at most 26.0% wt, more preferably at most 25.5% wt, even more preferably at most 25.0% wt, more preferably at most 24.5% wt and even more preferably at most 24.0% wt. The applicants have found that when the concentration of adhesive components is below these limits, that the adhesive bond which is formed is stronger and more reliable, in particular with the more adsorbent substrates, and this surprising in view of the lower amount of adhesive components in the composition. The applicants believe this advantage is due to an improved compromise between sufficient penetration of the adhesive into the substrate and a sufficiently fast removal of the water from the adhesive bond.

In another embodiment, the adhesive composition according to the present invention comprises at least 8.0% wt, based on the total adhesive composition, of adhesive components, preferably at least 10.0% wt, more preferably at least 11.0% wt, even more preferably at least 12.0% wt, yet more preferably at least 13.0% wt, more preferably at least 14.0% wt, even more preferably at least 15.0% wt, yet more preferably at least 16.0% wt, more preferably at least 17.0% wt, even more preferably at least 18.0% wt, yet more preferably at least 19.0% wt, more preferably at least 20.0% wt, even more preferably at least 21.0% wt, yet more preferably at least 22.0% wt. The applicants have found that when the concentration of adhesive components is above these limits, that the adhesive bond which is formed is also stronger and more reliable, in particular with the more adsorbent substrates. The applicants believe this advantage is due to the higher presence of adhesive components and a reduced presence of water, which also improves the compromise between sufficient but not excessive penetration of the adhesive into the substrate and a sufficiently fast removal of the water from the adhesive bond, which leads to a higher presence of adhesive component at the desired location of the adhesive bond, after removal of the water by evaporation.

It is preferred in the adhesive composition according to the present invention that, if starch and the boron compound is present, that at least 92.0% by weight of all the starches in the composition are in a cold water insoluble form, i.e. present as non-gelatinized and/or pearl starch. More preferably at least 93.0%, even more preferably 94.0%, yet more preferably at least 95.0%, more preferably at least 96.0%, even more preferably at least 97.0%, yet more preferably at least 98.0%, even more preferably at least 99.0% and most preferably as much as at least 99.9% by weight of the starch is present as pearl or ungelatinised starch. In a preferred embodiment without any gelatinized starch, the process step for first preparing the viscous carrier for the adhesive may be dispensed with entirely, which brings a significant simplification of the process. We prefer this feature to apply to all adhesive compositions according to the present invention containing starch, thus also to those compositions which are essentially free of any boron. The advantage is that gelatinized starch is highly prone to microbiological growth, developing an unpleasant odour, while pearl starch is not or hardly susceptible for this undesired phenomenon. The higher the proportion of the pearl starch in the composition, relative to the total starch, the higher the bacteriological stability of the composition according to the present invention. We have found that compositions whereby essentially none of the starch is gelatinized are characterised by a very high stability in terms of many of their characteristics, such as viscosity, adhesive power, etc. . . . , including odour. This advantage is particularly beneficial when flour is used as the source of starch.

In the composition of the present invention, the carbomer is preferably present in an amount of at least 5 ppm by weight based on the total adhesive composition and optionally not more than 2.5% by weight, preferably not more than 2% by weight, more preferably not more than 1.5% by weight and even more preferably not more than 1% by weight on the same basis. More preferably the carbomer is present in at least 50 ppm by weight, more preferably at least 500 ppm by weight, even more preferably at least 750 ppm by weight, yet more preferably at least 900 ppm by weight, more preferably at least 0.1% by weight, even more preferably at least 0.2% by weight. Preferably the carbomer is present in not more than 0.8% by weight, even more preferably not more than 0.5% by weight, preferably in the range of 0.25 to 0.45% by weight. The presence of the carbomer in the composition may be determined by Infra-Red (IR) Spectrometry, and with the development of a suitable calibration curve, this method may be made suitable for a quantitative determination of the amount of carbomer present in the composition. We prefer to use a Perkin Elmer FT-IR Spectrometer Spectrum 100, with a Universal ATR Sampling Accessory.

In the context of the present invention, a carbomer is defined as a water soluble polymer comprising as a monomer an unsaturated acid, or a derivative thereof such as an ester or amide, which may preferably be represented by the formula $CH_2=CR-CO-G$ or $CH_2=CR-COO-A^1$. In this formula, R represents a substituent selected from the group of H, monovalent alkyl, aryl or alkylaryl radicals and monovalent cyclo alkyl radicals, although H as the substituent is preferred, with $CH_3$ a very acceptable second choice. Nevertheless, R may also be selected from the group of alkyl, alkoxy, haloalkyl, cyanoalkyl and similar groups containing 1 to 9 carbon atoms. G may represent an amine group $-NL_2$, such as $-NH_2$, in which case the monomer is preferably acrylamide or methacrylamide. $A^1$ and/or L may independently from R and G represent a substituent selected from the group of H, monovalent alkyl, aryl or alkylaryl radicals and monovalent cyclo alkyl radicals, although H as a substituent is preferred, in which case the monomer is an unsaturated carboxylic acid. Nevertheless, $A^1$ and/or L may also be selected from the group of alkyl, alkoxy, haloalkyl, cyanoalkyl and similar groups containing 1 to 35 carbon atoms.

The carbomer preferably is primarily or entirely a homopolymer of (meth)acrylic acid or methacrylic acid, or a copolymer of mixtures thereof, and which may be cross-linked.

Optionally, other copolymers may be used. Further to a monocarboxylic acid and/or its ester, use may also be made of a polycarboxylic acid and/or its ester as comonomer, such as an acrylate or methacrylate, and optionally an alkyl alkoxylated ester, such as an alkyl alkoxylated acrylate or methacrylate, which may be a C15-C35 alkyl alkoxylated acrylate or methacrylate. In particular, olefinically unsaturated carboxylic acids containing at least one carbon-carbon olefinic double bond, and at least one carboxyl group are preferred, and/or esters thereof. Suitable examples include acrylic acids, in particular acrylic acid, methacrylic acid, ethacrylic acid, alpha-cyano acrylic acid, beta-methylacrylic acid (crotonic acid), alpha-phenyl acrylic acid, beta-acryloxy propionic acid, cinnamic acid, p-chloro cinnamic acid, 1-carboxy-4-phenyl butadiene-1,3, 3-acrylamido-3-methylbutanoic acid, itaconic acid, citraconic acid, mesaconic acid, glutaconic acid, aconitic acid, maleic acid, fumaric acid, and tricarboxy ethylene. Examples of suitable polycarboxylic acids include acid anhydrides, such as maleic anhydride, wherein the anhydride group is formed by the elimination of one molecule of water from two carboxyl groups located on the same carboxylic acid molecule. However, acrylic and methacrylic acid are preferred.

The alkyl alkoxylated acrylate or methacrylate is a hydrophobic co-monomer. The hydrophobic co-monomer will usually be an ester of an acid or a mixture of two or more thereof, and it may include one of the various known (meth)acrylates or (meth)acrylamides.

The alkyl group of the alkyl alkoxylated (meth)acrylate may contain 5-30 carbon atoms, preferably 15-30, more preferably 20-25 carbon atoms. The alkyl structure can contain primary, secondary, or tertiary carbon configurations. Examples of suitable alkyl alkoxylated acrylates include methoxymethyl acrylate, methoxyethyl acrylate, ethoxyethyl acrylate, butoxyethyl acrylate, or ethoxypropyl acrylate. The alkyl structure may also contain a phenyl group, which may be substituted, and suitable alkyl structures are octylphenyl, nonylphenyl and dodecylphenyl structures, of which the alkoxylated derivatives, such as those containing 1-12 ethoxy and/or propoxy groups are readily commercially available.

The monomers in the carbomer may be octadecyl acrylate, behenyl acrylate, dodecyl acrylate, hexadecyl acrylate and the like; and cyano derivatives thereof; methacrylates such as steryl methacrylate, methyl methacrylate, ethyl methacrylate, octyl methacrylate, isopropyl methacrylate, 2-ethylhexyl methacrylate, n-hexyl methacrylate, octadecyl methacrylate, behenyl methacrylate, dodecyl methacrylate, hexadecyl-methacrylate, and the like. Mixtures of two or three or more long chain acrylic esters may be successfully polymerized with one of the carboxylic acid and/or ester monomers. The preferred hydrophobic monomers are the linear, long chain hydrophobic monomers wherein the alkyl group contains at least 12 carbon atoms, such as stearyl methacrylate, hexadecyl methacrylate, and behenyl methacrylate. Optionally, a complex hydrophobe can be utilized containing polyalkyleneoxide branches capped with hydrophobic alkyl or alkylaryl groups.

For a (meth)acrylic acid ester of an alkoxylated alcohol the alkyl group is typically a C8-C24 alkyl; alkylaryl, including alkylphenyl groups such as octylphenyl and nonylphenyl; or the residue of a polycyclic hydrocarbyl compound such as lanolin or cholesterol. Suitable alkyl groups include tridecyl, myristyl, pentadecyl, cetyl, palmityl, stearyl, eicosyl, and behenyl or docosyl or mixtures thereof. Such a suitable monomer mixture may for instance originate from the alkoxylation of a mixture of lauryl, stearyl, cetyl, and palmityl alcohols.

The above-described carbomer (co)polymer is preferably cross-linked. As cross-linking agent, various polyunsaturated monomers may be utilized, whereby either a partially or substantially cross-linked three-dimensional network is obtained. Suitable cross-linking agents include allyl ethers of sucrose or pentaerythritol, or other polyunsaturated monomers for example diallyl esters, dimethallyl ethers, allyl or methallyl acrylates and acrylamides, tetraallyl tin, tetravinyl silane, polyalkenyl methanes, diacrylates and dimethacrylates, divinyl compounds such as divinyl benzene, divinyl glycol, polyallyl phosphate, diallyloxy compounds, phosphite esters, and the like. Typical polyunsaturated monomers include di, tri, or tetra, penta, or hexa-allyl sucrose; di, tri, or tetra-allyl pentaerythritol; diallylphthalate, diallyl itaconate, diallyl fumarate, diallylmaleate, divinylbenzene, allyl-methacrylate, allyl citrate, ethylene glycol di(meth)acrylate, trimethylolpropane triacrylate, 1,6-hexanediol diacrylate, pentaerythritol triacrylate, tetramethylene diethacrylate, tetramethylene dicarylate, ethylene diacrylate, ethylene dimethacrylate, triethylene glycol methacrylate, methylene bisacrylamide, and the like. Castor oils or polyols, esterified with ethylenically unsaturated carboxylic acid and the like may also be used. Preferred crosslinking agents include allyl pentaerythritol, allyl sucrose, trimethylolpropane allyl ether, and divinyl glycol.

A preferred carbomer according to the present invention may be a polymer having the formula (I)

In another embodiment the carbomer according to the present invention is a polymer having the formula (II).

In formulae (I) and (II), z may be 0 or 1, if z is 1, $(x+y):z$ may be from 4:1 to 1,000:1, preferably from 6:1 to 250:1; in which the monomer units may be in random order, y preferably being from 0 up to a maximum equal to the value of x; n is at least 1; and further R has the meaning specified herein before;

$R^1$ represents from 1 to 50 independently selected alkyleneoxy groups preferably ethylene oxide or propylene oxide groups;

$R^2$ represents a C4-C35 hydrocarbon group; preferably saturated alkyl but possibly containing a phenyl group, in which case we prefer $R^2$ to represent an octyl phenol, a nonyl phenyl or a dodecyl phenyl group;

$R^3$ represents hydrogen or C1-C4 alkyl, preferably H or $CH_3$;

$A^1$, $A^2$ and $A^3$ are independently selected from hydrogen and alkyl groups, preferably C1-C4 alkyl groups.

In the formulae (I) and (II), any of the groups —O-A1, —O-A2 or —O-A3 may also be replaced by an amine group, typically having the formula —$NL_2$, whereby L has the meaning as specified herein before.

For the production of the carbomer, any suitable polymerization technique may be employed. We prefer to use a free-radical polymerization technique such as those known in the art, e.g. such as being disclosed in Kirk-Othmer, 5th Edition, Wiley, in volume 20.

In an embodiment of the present invention, the carbomer has an average molecular weight Mn in the range of 20,000 to 5,000,000, preferably 35,000 to 3,000,000, more preferably 50,000 to 2,000,000, even more preferably 70,000 to 1,000,000, yet more preferably 80,000 to 500,000, even more preferably 90,000 to 200,000 and most preferably at most 130,000, as measured by GPC. The carbomer is preferably crosslinked. The molecular weight is preferably determined by Gel Permeation Chromatography (GPC) with the carbomer dissolved in dimethylacetamide (DMA) and on an analytical system which is calibrated with polymethylmethacrylate reference standards. More preferably the carbomer analysed as such also has, always relative to DMA, an Mw in the range of 50,000 to 5,000,000, preferably 100,000 to 3,000,000, more preferably 130,000 to 2,000,000, and even more preferably 150,000 to 200,000. The polydispersity of the copolymer is preferably in the range of 1-5, more preferably from 1.1 to 4.0, even more preferably from 1.2 to 3.0, yet more preferably from 1.3 to 2.0, even more preferably from 1.4 to 1.7 and even more preferably at most 1.7. determined by the same method.

In the context of the present invention, cold water insoluble starch is defined as raw starch, i.e. starch which is not yet partially or entirely converted to the cold water soluble form by heating and/or treating with a base such as NaOH. The total amount of starch, the amount of cold water soluble or gelatinized starch and the amount of cold water insoluble or ungelatinized starch may be determined by methods known per se in the art. We prefer to use the so-called enzymatic method, such as described by H. M. Blasel et al. in "Degree of starch access: An enzymatic method to determine starch degradation potential of corn grain and corn silage", in Animal Feed Science and Technology, 128 (2006), 96-107, and in the literature references thereof, such as by Varriano-Marston et al., "Comparison of methods to determine starch gelatinization on bakery foods, Cereal Chem. 57 (1980), 242-248.

In an embodiment of the present invention, the adhesive composition has a pH of at most 13.0, preferably at most 12.5, more preferably at most 12.0, yet more preferably at most 11.5, more preferably at most 11.0, even more preferably at most 10.5, yet more preferably at most 10.0, even more preferably at most 9.5, yet more preferably at most 9.0 or even better at most 8.5, even more preferably at most 8.0, and most preferably at most 7.5, and optionally a pH of at least 4, preferably at least 5, more preferably at least 6.0, even more preferably at least 6.5 and most preferably at least 6.8. It is important to remember that pH is a logarithmic scale, such that a single unit reduction in pH, such as from 12.5 to 11.5, represents a factor 10 reduction in base concentration, and thus a tenfold reduction in the caustic soda concentration.

The applicants have found that the carbomer itself may affect and reduce the gel point of starch and or dextrin, such that less base may be required to obtain a desired gel point reduction. This brings the advantage that less or no base may be added to the composition. This advantage may be used up to the preferred point where base is only used to compensate for any acidity which may have been introduced by the carbomer, and the adhesive composition ends up with a pH in any of the narrower ranges specified above, preferably in the range of 6.8 to 7.2. This brings the advantage that an adhesive may be provided which contains substantially no free caustic soda, and which may thus be used without any of the toxicity and/or health concerns associated with free caustic soda.

We have further found that the carbomer, even in the low concentrations as used in the context of the present invention, brings water resistance to the starch and/or dextrin based adhesive compositions of the present invention, we believe this being caused by a reaction of the carbomer with the starch and/or the dextrin. This brings the advantage that the starch based adhesive composition of the present invention requires less water-resistant resin in order to meet the requirements of a water resistant adhesive, such as for example required by standard NFQ 03.042.

In another embodiment, the adhesive composition of the present invention further comprises carboxymethyl cellulose (CMC) or cellulose gum, or xanthan gum. This compound may contribute by further modifying the viscosity and/or thicken the composition. We have found that CMC may be used in combination with the carbomer, and that an adhesive composition according to the present invention containing CMC preferably has a pH of at most 10.0, more preferably at most 9.0, in order to avoid a degradation of the CMC by a strong base such as NaOH.

In another embodiment of the present invention, the adhesive composition has a gelation point of at most 70° C., preferably at most 65° C., more preferably at most 62° C., even more preferably at most 60° C., yet more preferably at most 58° C., and most preferably at most 57° C. The gelation point may preferably be even lower, such as at most 55° C., preferably at most 53° C. or even 52° C., and even more preferably at most 52° C. This reduced gel point or gelation point brings the advantage of a lower temperature requirement for achieving the bonding function, which reduces the energy requirements of the application process.

Preferably the adhesive composition of the present invention has a refractometer reading in % Brix of at most 15%, preferably at most 14%, more preferably at most 13%, even more preferably at most 12%. We prefer the refractometer reading to be as low as possible, preferably at most 10%, more preferably at most 7% or even 5%, even more preferably at most 3% or even 1% and most preferably 0%.

In another embodiment, the adhesive composition according to the present invention has a viscosity at 25° C. in the range of 500 to 5000 mPa·s or centiPoise (cP), as measured on a Brookfield viscosimeter with spindle 4 and at a spindle speed of 150 rotations per minute (rpm). This viscosity measured at 150 rpm is preferably in the range of 550 to 3000 cP, more preferably in the range 570 to 2000 cP and most preferably in the range 600 to 1000 cP.

Preferably the viscosity of the adhesive composition at a spindle speed of 1 rpm is in the range of 3000 to 60000 mPa·s, more preferably at least 5000 mPa·s, even more preferably at least 10000 mPa·s, yet more preferably at least 12000 mPa·s.

In an even more preferable embodiment, the viscosity of the adhesive composition according to the present invention increases strongly when the amount of shear stress applied reduces to low values. As such, the ratio of the viscosity of the adhesive composition according to the present invention, as measured on a Brookfield viscosimeter with spindle 4 at 25° C. and expressed in mPa·s or cP, and which is measured at a spindle speed of 1 rpm (low shear) divided by the viscosity measured at a spindle speed of 150 rpm (high shear) is preferably at least 5.00, preferably at least 7.0, more preferably at least 10.0, even more preferably at least 12.0 or even 15.0, even more preferably at least 20.0. The higher this ratio, the better the difference in behaviour of the adhesive between where it is applied to the applicator roll by means of a knife or a doctor roll and where it is applied to the tips of the corrugations, as compared to where the corrugations separate from the applicator roll, and thus where the occurrence of spinning and other undesired phenomena may be minimized or avoided. With a high ratio, an adhesive may be prepared which, compared to conventional Stein-Hall adhesives, has a lower viscosity at high shear, and thus allows operating at higher line speeds, while less adhesive has to be applied because undesirable effects at low shear conditions, primarily where the corrugations separate from the applicator roll, such as spinning and "wicking", are avoided. In another embodiment, the composition according to the present invention is substantially free of boron or a boron-containing compound and/or of free NaOH. The term "substantially free" in this context means that any presence of these compounds is below a level at which it may raise a concern for the consumer and/or for the legislator. The presence of the particular compound may be determined using the analytical method which was used or prescribed in the context of the particular concern. Suitable analytical methods for measuring boron content and/or free NaOH are well known in the art.

In another embodiment of the present invention, the composition further contains a boron-containing compound, preferably a boron-containing compound selected from the group consisting of boric acid, a sodium or potassium polyborate, in its hydrated or unhydrated form, boric anhydride, sodium or potassium metaborate, preferably a sodium tetraborate, pentaborate or octaborate, more preferably sodium tetraborate decahydrate (borax), and mixtures thereof. Boron compounds, if their presence is considered acceptable, bring the advantage of a viscosity effect by reaction with the starch, a gel point reduction effect, and may also have a plastifying effect.

The boron-containing compound may be brought into a suspension by means of the carbomer according to the present invention. Most suitable is to first prepare a gel containing carbomer in water in a concentration in the range of 0.5-6% wt, preferably 1-5% wt and more preferably 2-4% wt, typically using a high shear mixer. Into 1000 kg of this gel may be suspended a boron-containing compound, such as from 100 to 2000 kg of borax, preferably from 400 to 1800 kg of borax, more preferably from 500 to 1500 kg of borax, even more preferably from 550 to 1000 kg of borax. The boron-containing compound may be added during simple mixing, or may be added during the preparation of the gel in the high shear mixer. This borax suspension obtained is suitable as an additive for adding boron into a conventional Stein-Hall adhesive, as well as into an adhesive of the present invention.

In other embodiments, the composition according to the present invention further comprises one or more ingredients selected from the group consisting of an adhesion promoter, a surface tension agent, an antifoam agent, a descaling agent, an optical clarification agent, a fungicide, a bactericide or anti bacterial agent, a colorant, a wetting agent, a viscosity modifier, a rheology modifier, an antifreeze, a solvent, and mixtures thereof. These ingredients may be introduced at any point in the process of the present invention, and in any of the carriers as specified.

The composition according to the present invention may also comprise a filler. Any suitable filler known in the art may be used, and the applicants prefer to use calcium carbonate, a silicate, sand, talc powder, wood flour, or mixtures thereof. The filler increases the dry solid matter content of the adhesion composition above the amount contributed by the adhesion components and the other ingredients.

An adhesion promoter may be added to increase the strength of the adhesion bond to be formed with the adhesive compositions according to the present invention. Many adhesion promoters known in the art may be used. The applicants prefer to use a carbomer as defined in the context of this invention as an adhesion promoter. The applicants more prefer to use as adhesion promoter a carbomer which is at least highly, more preferably fully water soluble, i.e. a carbomer which is not or only to a very small extent cross-linked. Most preferred is to use a poly acrylate or methacrylate which is not cross-linked. Suitable adhesion promoters may be obtained from a variety of sources, such as the Carbobond acrylic emulsion family available from Lubrizol, in particular Carbobond 26373, Carbobond 1995, Carbobond 3005 and Carbobond 26387, and preferably Carbobond 26373. Other suitable adhesion promotors are the members of the Carbotac acrylic emulsion family available from Lubrizol, such as Carbotac 1814, Carbotac 26171, Carbotac 26146 and Carbotac 26222, preferably Carbotac 1814. The adhesion promoter also helps significantly in building the adhesive bond more quickly, so that processing speed may be increased. Such adhesion promoter also brings an advantage of low heat sealing temperatures, which may be important with heat-sensitive substrates. These advantages individually and collectively allow higher processing speeds, in particular in high speed laminating operations. The adhesion promoter may also bring improved adhesion to polar substrates, and an improved water resistance.

The applicants prefer to use the adhesion promoter in a concentration, based on the total adhesive composition, of at least 0.5% wt, preferably at least 1.0% wt, even more preferably at least 1.5% wt and yet more preferably at least 2.0% wt, and optionally at most 10% wt, preferably at most 7.0% wt, more preferably at most 5.0% wt, even more preferably at most 3.0% wt, also based on the total weight of the adhesive composition.

The applicants have found that the combination of the carbomer as the additive and the second carbomer as adhesion promoter slow down the crystallisation or solidification of the adhesive components in the composition. In particular when used with adsorbent substrates, this increases the penetration depth and penetration rate of the adhesive composition, and thereby increases the ultimate bond strength. This phenomenon also allows a significant increase of the amount of filler which may be tolerated into the composition. This allows increasing the total dry solid matter of the adhesive composition, while maintaining sufficient stability of the composition.

The applicants prefer that the adhesive compositions of the present invention have a total dry solid matter content of at least 15% wt, preferably at least 20% wt, more preferably at least 25% wt, even more preferably at least 30% wt, more preferably at least 35% wt, even more preferably at least 40% wt, yet more preferably at least 45% wt, even more preferably at least 50% wt, more preferably at least 55% wt, even more preferably at least 60% wt, and optionally not more than 75% wt, preferably at most 70%, yet more preferably at most 65% wt, based on the total adhesive composition. The advantage is that a higher dry solid matter content reduces the drying time, which usually allows increasing the processing speed. An upper limit is preferred because when the dry solid matter content becomes too high, the penetration of the adhesive composition into an absorbent substrate may suffer.

The applicants have found that a so-called "cold" adhesive prepared with polyvinyl alcohol and/or dextrine as the adhesive components, in combination with the carbomer according to the present invention, and further combined with a polyacrylate adhesion promoter, is able to carry a large amount of filler such as calcium carbonate while remaining stable. Thanks to the high dry solid matter content, and also thanks to the rheological properties being improved by the carbomer, this composition was found to be very suitable for lamination, for tube winding, for paper gluing, such as with cardboard boxes, and for the production of corrugated cardboard. Also other fillers, such as sand or silicon fillers, or other fillers also known to the person skilled in the art, are considered suitable. The applicants have found that such adhesive composition provides very high and fast adhesive power and is able to also dry very fast.

The addition of a surface tension agent, such as a surfactant, brings the advantage of a better and faster penetration of the adhesive into the paper or cardboard, and thus allows running the process at higher line speeds. The surfactants may be anionic, cationic, non-ionic or zwitterionic. We prefer to use a surfactant which is pH neutral or even slightly acidic. We prefer that the surfactant is a kind which causes low foam formation. We prefer to use a liquid soap. Several suitable types are known in the industry, too many to be listed.

Suitable anti-freeze agents are also well known in the art. They prevent that the adhesive lines may block up by ice formation during winter and/or in cold locations. We prefer to use propylene glycol and/or ethylene glycol, such as those obtainable from Dow Chemical. Descaling agents are also known in the art. They bring the advantage of preventing or reducing the sedimentation of calcium-based sediments inside the adhesive equipment. We prefer to use Baypure® DS100 obtainable from Lanxess.

Many suitable anti-bacterial agents are known in the industry, and are too many to be listed.

The solid dry premix provided by the present invention may also further comprise any of the further ingredients specified above for the adhesive composition according to the present invention.

In addition, the solid dry premix according to the present invention further comprises an anti-caking agent, bringing the advantage of maintaining the premix as a free flowing solid mixture. Suitable anti-caking agents are well known in the art. We prefer to use silica, such as Wacker HDK H15, Evonik Industries Aerosil®, or Orasil® m130.

In special applications, the adhesive is preferably water-resistant, a property which is typically obtained by the addition of particular resin, such as a polyvinyl alcohol (PVA). With starch and/or dextrin based adhesive compositions, typically these resins react with hydroxyl groups on the starch and/or dextrin and render the starch or dextrin insoluble in water. These resins may also be of the aldehyde type, such as aminoplasts, for instance ketone/formaldehyde, ureum/formaldehyde, melamine/formaldehyde, phenol/formaldehyde resins, or equivalents. A problem is that some of these resins may react with borax in the formula, which may change the viscosity of the adhesive.

Superior water resistance may be obtained, also in combination with starch, by using PVA in a ratio of 1/20 to 1 (weight ratio) relative to starch, preferably in a ratio from 1/20 to 1/7. The definition of PVA includes perfectly saponified PVA and/or PVA aqueous derivatives, for example, the partially or strongly acetated derivative forms of PVA. The higher the polymerization degree of these polymers is, the more effective the polymers are.

The process provided by the present invention comprises several variants.

In one embodiment, the process includes the first step of producing a conventional viscous first carrier based on gelatinised starch, as explained in the context of the Stein-Hall process above or any of its known variants. The tertiary amount of water and the adhesive compound of step d) may then be added to this first carrier, upon which the carbomer may be added, either as a powder or a liquid, or as a solution in a secondary amount of water, which solution is called here the second carrier, due to its viscosity being higher than water.

Dissolving a carbomer in water, such as in optional step b), is preferably performed under high shear mixing.

The applicants have found that a solution of carbomer in water may be acidic. In another embodiment, the process of the present invention comprises an optional step c) for neutralizing, in the absence of any starch, the second carrier of step b) to the desired higher pH by mixing in a base. The applicants prefer to use caustic soda in this step, but other bases such as soda ash, potassium hydroxide and other known bases may be suitable. The base may be added pure or in solution, and the applicants prefer to use a solution because this is easier to dose. The product from this step c) is called the third carrier.

In another embodiment, the process of the present invention simply comprises the step of dissolving the carbomer in water to form the second carrier, and mixing in the tertiary amount of water and the adhesive component, which may be all pearl starch, even more preferably introduced as flour, to form the aqueous adhesive composition. This represents a very simple but highly time, cost and resource effective version of the process to obtain the desired adhesive composition, and which may readily be introduced as part of many versions of the corrugating process. Mixing the carbomer as a powder into an aqueous solution is preferably performed under high shear conditions, with a high shear mixer. Suitable industrial types of high shear mixers are well known in industry. In the laboratory we preferred to use an IKA magic LAB High Shear Mixer. Mixing the carbomer as a liquid dispersion into another liquid is preferably performed without applying high shear, but with a slow mixer, such that the formation of foam is minimized and the risk for forming a whipped mousse is reduced.

In yet another embodiment of the process according to the present invention, in step a), b), c) or d) is mixed in at least one further ingredient selected from the group consisting of a boron-containing compound, carboxy methylcellulose (CMC), xanthan gum, an adhesion promoter, a surface tension agent, an antifoam agent, a descaling agent, an optical clarification agent, a fungicide, a bactericide, a colorant, a wetting agent, a viscosity modifier, a rheology modifier, an antifreeze, a solvent, and mixtures thereof.

In an alternative of the process of the present invention as presented above, the invention provides for a process to produce the solid dry premix according to the present invention by dry blending the adhesive component or components, the carbomer, optionally sufficient base, and any further ingredient as desired to obtain the desired solid premix, whereby the premix is a suitable intermediate for mixing with the necessary amount of water to obtain an aqueous adhesive composition according to the present invention.

In yet another embodiment, the solid dry premix may be obtained through a wet process, whereby the aqueous adhesive composition according to the present invention may be formed, followed by an additional step wherein water is evaporated to obtain a dry powder. This powder may then be made available for mixing with water and obtaining an aqueous adhesive composition according to the present invention.

In another embodiment, the process according to the present invention further comprises the step of employing the aqueous adhesive composition of step c) or the solid premix of step d) to form an adhesive bond, preferably with a layer of paper of cardboard, more preferably with a layer of corrugated cardboard, to form an article comprising the adhesive bond, the article preferably being selected from the group consisting of laminated corrugated paper or cardboard, compact paper or cardboard, and a packaging item comprising cardboard or corrugated cardboard.

The applicants have found that the adhesive composition according to the present invention reduces the risk for deformation of the corrugations of the card/paper board. The applicant believes that this advantage is brought by a decreased penetration ability of the adhesive into the paper/card board. In his opinion, decreasing adhesive penetration should allow saving on the amount of adhesive applied, thus limiting the amount of water contacting the paper/card board and in that way limiting the amount of water penetrating the paper/card board.

The applicant has now found that this advantage is obtained by the improved rheology behaviour brought primarily by the carbomer. This brings a reduced viscosity at the time of application, so that a smaller amount and a thinner layer of adhesive may be applied to the corrugations. With a thinner layer applied, the amount of water contacting and penetrating the paper/card board is reduced, thus reducing energy requirements for evaporating water which during the course of the lamination process penetrates the corrugated paper board. The reduced water penetration also minimises the risk for deformation of the corrugated paper/card as well as of the flat liners. The applicant further found that preferably the viscosity of the adhesive composition after application should be sufficiently high to ensure good adhesion.

The presence of the carbomer allows to meet both requirements of a sufficiently low viscosity at the time of application and a sufficiently high viscosity at the time of effectuating the adhesion, as this brings pseudo plastic properties and is capable of imparting this pseudo plastic behaviour to the adhesive composition containing them, even when present in a low concentration in the adhesive composition only. With the adhesive composition according to the present invention, viscosity changes strongly with the shear forces applied to it. In particular, the adhesive composition of the present invention has the effect that It shows a reduced viscosity when applied to the corrugated paper/card, so that the amount applied may be minimised.

as soon as the adhesive composition has been applied to the corrugations, an almost instantaneous increase in viscosity takes place which prevents the adhesive from flowing away and ensures good adhesion. The higher viscosity at low shear stress is restored virtually immediately upon removal of the shear forces, as a consequence of which penetration of the adhesive into the card/paper board is minimised. The reduced adhesive penetration reduces water penetration. This has the consequence that energy requirements for evaporating the penetrated water may be minimised, such that a paper/card board with an improved strength may be obtained and that the tendency to lasting of the paper board may be reduced, thus putting the paper board available for further processing after a much shorter drying time. On the other hand, the viscosity is such that sufficient water penetration is ensured to minimise the risk to the formation of cracks in the paper/card board.

The applicant has observed that the viscosity of the adhesive composition may be reversibly increased and decreased. Thus, any adhesive which has not be transferred from the applicator to the cardboard surface but remained on the applicator, may be recycled and re-used without this adversely affecting the adhesive strength or its viscosity. The applicant has further observed that the adhesive composition shows a better affinity for the card/paper board and provides an improved adhesion as well as improved printability of the surface as compared to prior art adhesive compositions. Conventional prior art adhesive compositions control the viscosity of the adhesive composition by controlling the gelling of the starch in the composition. However, gelling is an irreversible process. Once gelled, the adhesive composition typically cannot be re-used and looses its adhesive properties. With the present invention, the viscosity of the adhesive composition may be controlled independently of the gelling process.

Homopolymers of acrylic acid and methacrylic acid are preferred for as carbomer, because of their superior properties, and ease of production.

The carbomer may be cross-linked. Preferably use is made of a cross-linking agent which is a polyalkenyl polyether, in particular an allylpentaerythritol. Other suitable cross-linking agents include polyfunctional vinylidene monomers containing at least two terminal $CH_2=C$ groups, for example butadiene, isoprene, divinylbenzene, divinyl naphthalene, allyl acrylates, and the like. The term vinylidene is used herein as meaning terminal vinyl in general, i.e. in its broader meaning in which it also comprises the terminal $CH_2=CH-$ group. Preferred cross-linking agents are those containing an alkenyl group in which an olefinic double bond is attached to a terminal methylene group. Particularly preferred cross-linking agents include polyethers which contain on average two or more alkenyl ether groups per molecule. Other suitable cross-linking monomers include diallyl esters, dimethylallyl ethers, allyl or methallyl acrylates, acrylamides. Examples of those are allyl pentaerythritol, allyl sucrose, trimethylolpropane triacrylate, 1,6-hexanediol diacrylate, trimethylolpropane propane diallyl ether, pentaerythritol triacrylate and the like.

The carbomer may be a copolymer comprising an acrylate ester or an acrylamide as a comonomer. Representative acrylates include methylacrylate, ethylacrylate, propylacrylate, butylacrylate, methylmethacrylate, methylethacrylate, octylacrylate, laurylacrylate, stearylacrylate, behenyl acrylate, and the corresponding methacrylates. Other comonomers include acrylic nitriles, i.e. olefinically unsaturated nitriles preferably those having 3-10 carbon atoms, for example acrylonitrile and methacrylonitrile; monoolefinically unsaturated acrylic amides, for example acrylamide and methacrylamide; N-alkylolamides of $\alpha,\beta$-olefinically unsaturated carboxylic acids including those having 4-10 carbon atoms, preferably N-methylolmethacrylamide.

The adhesive composition of this invention presents the advantage of showing an increased cohesion, as a consequence of which the risk to cracking of the adhesive layer, once applied, may be reduced. The adhesive composition of this invention is particularly suitable for the manufacturing of the more recently developed corrugated paper/card boards, where there is an increasing tendency to reduce the width and increase the number of corrugations. In the recently developed corrugated boards, the corrugations may have a height of between 0.6 and 6.5 mm, the strength of the corrugations decreasing with increasing height. The adhesive composition of this invention is further particularly suitable for the manufacturing of the more luxurious, coated paper, which is usually coated with a coating agent that hampers evaporation of water. As with the present invention water penetration is reduced, the amount of water that needs to be evaporated is also reduced and the risk to formation of steam bubbles when evaporating the water is minimised.

Suitable commercially available products for use as the carbomer in the adhesive composition of this invention are available from Sigma Chemical Company, such as the products provided under the tradename Polygel®, for instance Polygel® CB 3V, Rohm & Haas for example the products offered under the tradename Acusol®, Noveon or Lubrizol for example products offered under the tradenames Pemulen™ and/or Carbopol®, such as Carbopol 674, 691 or 981, Carbopol ETD 2050, or Novethix® L-10, from Wako Pure Chemical Industries of Japan, or from Allied Colloids of Great Britain for example Salcare®, or the products offered under the tradename Flosperse™ by SNF Floerger. The carbomer may be obtained as a solid powder, such as the Carbopol 674 or the Polygel CB-3V, but they may also be obtained as liquid dispersions, such as Polygel W400 or Polygel W301 or Polygel DR. The liquid forms are easier to process, as they do not require high shear mixing, which is strongly desired for bringing a powder carbomer into solution. Novethix L-10 is described in much detail in our copending patent application PCT/EP2010/053051.

The carbomer will mostly be water soluble. It may be mixed as such with an adhesive composition in the solid state, or added to an aqueous adhesive composition. To facilitate mixing in the dry state, the carbomer is preferably diluted with a solid product before being added to a formulation. Suitable diluting agents are for example starch or inert inorganic oxides, for example silicium dioxide, aluminium oxide, magnesium oxide, or mixed oxides of two or more of those. In that case the carbomer is typically mixed with the diluting agent before being added to the composition. The carbomer can be mixed in the form of a solid composition with a solid starch composition, or can be added to a liquid starch composition as a liquid composition. The use of starch as a diluting agent for the carbomer assists in minimising the risk to the formation of lumps.

Because of the low amount of carbomer needed, (i) the solids content of the adhesive composition according to the present invention remains virtually unaffected, which is important when processing the composition in terms of minimising the risk to the occurrence of clogging of the process equipment; (ii) there is no need to leave out or modify any other ingredient of the adhesive composition to compensate for any property that might have changed in an undesirable manner; (iii) the need to re-consider the nature and concentration of the components present in the adhesive composition, to compensate for the additive, can be dispensed with as well as the need to partially or fully remove one or more compounds of the adhesive composition.

The starch used in the adhesive composition according to the present invention may be selected from the generally commercially available starches, for example rice, wheat, corn, potato, tapioca or pea starch. The starch may be used in its natural form, or it may be physically, chemically or enzymatically modified. Physically modified starch is generally available in the form of roll-dried or extruded starch.

The conventional starch used in starch-based adhesives is produced as a pure product by a wet process, as explained above. Industrial starch is usually only produced from selected natural sources, as not all plants provide the quality desired for the industrial processes. This process is also rather complex and the starch product is therefore less readily available and at a relatively high cost. The applicant has now found that the adhesive compositions according to the present invention may accommodate also lower quality starches, from sources which are almost not used for this purpose today. The compositions according to the present invention therefore provide a wider choice of starch, many of which come from cheaper raw materials and may therefore be offered at more economical conditions.

The applicants have further found that in the adhesive compositions of the present inventions, the starch may also be provided in a less pure form, such as the flour obtained from the dry processing of natural feedstocks, as explained above. Flour is a much cheaper feedstock compared to the starch produced from the wet process. The adhesive compositions may thus be produced from feedstocks that are more readily available and much more economical as compared to the conventional adhesives based on pure starch. In view of the high consumption of adhesive, this advantage is of high importance to the adhesive consumer, such as the corrugated board producer.

The use of flour as the source of starch is particularly suitable with compositions having a pH which is not too strongly alkaline, preferably at most 10.0, more preferably at most 9.0 and even more preferably at most 8.0. We have found that proteins present in flour may react with strong bases, such as NaOH, and form an adhesive which is not suitably stable and vulnerable to microbacteriological attack.

In an embodiment, the adhesive composition according to the present invention contains dextrins as adhesive component, and may even be dextrin-based. Frequently dextrin adhesives and many starch based adhesives are formulated with boron compounds such as borax (sodium tetraborate) to obtain high tack at moderate concentrations and viscosities with good aging characteristics. They also have good adhesion and machining properties. The borax is generally added in amounts of up to 10% based on dry starch. Sodium hydroxide is also added, as believed to convert the borax to more active sodium metaborate. Applications include case sealing, carton sealing, bag seams, tube winding, and laminating.

Dextrin-based adhesives are usually manufactured by first dry-roasting starch in the presence of an acid catalyst. Through treatments with heat and acid, the starch molecules are hydrolyzed into small fragments, and then repolymerized into highly branched, readily water-soluble polymer molecules of moderate size. Unlike starch, dextrins are soluble in water. The severity of the heat and acid treatment determines the degree of solubility, which is the basis for classifying dextrins. Finished dextrins typically are very fine powder varying in colour from pure white to brown. The industry recognizes three main types of dextrin adhesives: white dextrins, canary or yellow dextrins, and Britisch gums. The differences are determined by the roasting time and the temperature and amount of catalyst used.

White dexrin is usually roasted at 120-130° C. for 3-7 hrs with a high catalyst concentration. The viscosity of its derived adhesive is rather prone to degradation.

Yellow dextrin is usually roasted at 135-160° C. for 8-14 hrs with a moderate catalyst concentration. It typically leads to a very good solubility in water, and an adhesive having a good viscosity stability.

Britisch gum dextrins are usually roasted at 150-180° C. for 10-24 hrs with a small catalyst concentration. It also leads to a good viscosity stability, but usually higher than with the yellow dextrin.

The British gums are dextrins with the highest molecular weight and they are the strongest adhesives among the dextrins, but maximum usable solids content is only approximately 25%. Yellow dextrins are the lowest in molecular weight. Materials of this type are available that give a viscosity of only 1700 cps at 60% concentration. The white dextrins have the lowest color of the three. Their molecular weight is intermediate between those of the other two.

The range of solubilities of dextrin adhesives are advantageous in that there can be formulated a range of solutions of very different viscosities leading to a variety of gel strengths. These formulations can then be further modified. Generally the same additives and processes used for starch adhesives are used for formulating dextrin adhesives.

Dextrins are often preferred to starch, as they need less or no cooking and much less water to form the paste. This means that drying time is reduced and there is little likelihood of mold infection in warmer climates. As adhesives, dextrins are used in many of the same applications as starch adhesives. Dextrins are also used as a core binding material in the manufacture of foundry cores. Here the main function is to give good green strength and to prevent deformation of the core before being fired in the oven.

Plasticizers are widely used into adhesive compositions to control brittleness of the glue line and to regulate the speed of drying. Common plasticizers include glycerin, glycols, sorbitol, glucose, and sugar. These types of plasticizers act as a hygroscopic agent to decrease the drying rate of the film. Plasticizers based on saps, polyglycols, and sulfonated oil derivates lubricate the layers within the dried adhesive and, thus, impart flexibility. Urea, sodium nitrate, salicylic acid, and formaldehyde plasticize by forming a solid solution with the dried adhesive.

Chemicals such as calcium chloride, urea, sodium nitrate, thiourea, guanidine salts, etc. are used as liquefiers to reduce viscosity or as humectants to control open time and speed of drying. They are usually added at about 5-20% based on dry starch or dextrin. Colloid stabilizers such as soaps and sodium chloride are sometimes used to retard the tendency to retrogradation.

Native starches are capable of yielding high degrees of water resistance, which may be necessary for labeling, bill posting, and other applications. Improved cold water resistance can be obtained with polyvinyl alcohol or polyvinyl acetate blends. These adhesives will also dissolve in hot water, which is often a benefit. Optimal moisture resistance is obtained through the addition of thermosetting resins, such as urea formaldehyde or resorcinol formaldehyde.

Mineral fillers such as kaolin clay, calcium carbonate, titanium dioxide, etc. are often used in starch and dextrin adhesives at concentrations of 5-50%. These are used to reduce cost and control penetration into porous substrates. Thixotropic agents such as bentonite are also often used in certain applications to control viscosity.

Other additives which are found in starch and dextrin based adhesive include preservatives, bleaches, and defoamers. Commonly used preservatives used to prevent microbial activity include formaldehyde (35% solids) at 0.2-1.0%, copper sulfate at about 0.2%, zinc sulfate, benzoates, fluorides, and phenols. Possible toxic effects must be carefully considered before choosing a preservative. Common bleaching agents include sodium bisulfite, hydrogen and sodium peroxide, and sodium perborate. Organic solvents are sometimes added to improve the adhesion to waxed surfaces.

The adhesive composition according to the present invention may further contain an optical clarification agent, to allow controlling the quality of the adhesive composition using UV irradiation.

The process according to the present invention may further comprise the production of laminated corrugated paper or card board, optionally comprising a plurality of super imposed layers of corrugated paper or card connected together by intermittent flat sheets of paper, whereby an amount of the above described adhesive composition is applied to the top of the corrugations, after which the layers are adhered to each other under pressure. The article made by the process according to the present invention may be selected from the group consisting of laminated non-corrugated or corrugated paper or card board, cardboard, corrugated cardboard, optionally in the form of a tube or a wound tube, and a container or packaging container comprising cardboard or corrugated cardboard.

The present invention is now further illustrated by the following examples.

EXAMPLE 1

Conventional Stein-Hall Adhesive

A conventional Stein-Hall adhesive was produced as follows, based on modified wheat starch Mylbond 210 obtained from Syral SA. First a starch carrier was prepared by mixing 885 kg of water heated to 39° C. with 70 kg of the starch and 23.5 kg of NaOH solution at 29% wt strength. This mixture was stirred during 780 seconds in order to gelatinize the starch and to obtain a carrier. To this carrier were added 960 kg of secondary water, 416 kg of secondary starch and 4.4 kg of borax (sodium tetraborate decahydrate). This mixture was further mixed during 720 seconds. The adhesive composition C obtained had a dry solids content of 21% wt, a gel point of 54° C. and a Lorry cup viscosity at 30° C. of 14 seconds. The viscosity curve shown as C in FIG. 1 was determined. The curve shows viscosity expressed as mPa·s or cP against shear stress, in this case spindle speed R in rotations per minute (rpm). The curve was established using a Brookfield RV apparatus using spindle number 4.

EXAMPLE 2

Carbomer-Based Adhesives A and B

The carbomer used in this example was Carbopol 941 obtained from Lubrizol. Carbopol 941 may be described as a cross-linked polyacrylic acid polymer, available in powder form. When submitted to Gel Permeation Chromatography (GPC) dissolved in dimethylacetamide (DMA), the Carbopol 941 gave a spectrum showing a broad peak in between a retention window of 21 to almost 32 minutes which provided the following molecular weight information relative to DMA and on an analytical system which is calibrated with polymethylmethacrylate reference standards: an Mn of 96483, an Mw of 163802, resulting in a polydispersity Mw/Mn of 1.70, an MP of 114358 at a retention time of about 26 minutes, an Mz of 263738 and an Mz+1 of 379289.

Carbomer Gel Preparation

In an IKA magic LAB High Shear Mixer 40 grams of Carbopol 941 powder was mixed into 920 grams of water, and the pH was brought up to 6.8 by introducing 40 grams of NaOH solution of 29% wt strength.

Carbomer-Based Adhesive Preparations

Native corn starch (220 grams) were mixed into 700 grams of water and stirred for 120 seconds. 80 grams of the carbomer gel were introduced and further mixed during 120 seconds in order to obtain adhesive A. The adhesive composition A obtained had a dry solids content of 22% wt, a gel point of 58° C. and a Lorry cup viscosity at 28° C. of 35 seconds. The viscosity curve was determined as in Example 1 and is shown as curve A in the figures. The viscosity curve was again determined on the same sample after 24 hrs, and is shown as curve B in the figures.

Figure 1:
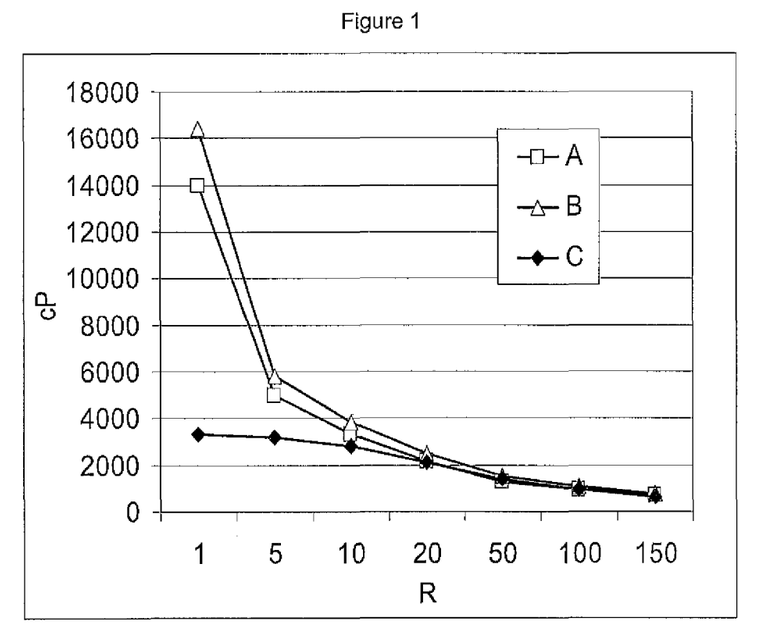

FIG. 1 compares the viscosity curves of the fresh carbomer-based adhesive A with the conventional Stein-Hall adhesive C. Adhesive A has about the same viscosity at higher shear (spindle speeds of 20 rpm or higher), which is important for pumping the adhesive and for where the adhesive layer is applied onto the applicator roll, in particular where the high speed doctor roll meets the applicator roll. At low shear rates the carbomer-based adhesive is much more viscous than the Stein-Hall adhesive, which is important for avoiding the spinning of the adhesive where the corrugated cardboard separates from the applicator roll.

FIG. 1 further shows that the viscosity of the carbomer-based adhesive only slightly increases over 24 hrs storage, and that the viscosity curve remains very close to this of the fresh adhesive.

In another 600 liter of the carbomer gel of this example, an amount of 350 kg of borax (decahydrate) was mixed and a stable suspension of the borax was obtained. A similar stable borax suspension was obtained when mixing 10 kg of Carbopol 674 in 1000 liter of water using high shear mixing, followed by adding 1500 kg of borax under stirring.

EXAMPLE 3

Carbomer-Based Adhesives D and E

Carbomer Gel Preparation

In an IKA magic LAB High Shear Mixer 40 grams of Carbopol 941 powder was mixed into 1000 grams of water, and the pH was brought up to 6.8 by introducing 40 grams of NaOH solution of 29% wt strength.

Carbomer-Based Adhesive Preparations

Native corn starch (220 grams) were mixed into 680 grams of water and stirred for 120 seconds. 100 grams of the carbomer gel were introduced and further mixed during 120 seconds in order to obtain adhesive D. The adhesive composition D obtained had a dry solids content of 22% wt, a gel point of 58° C. and a Lorry cup viscosity at 28° C. of 45 seconds. The viscosity curve was determined as in Example 1 and is shown as curve D in the figures. The viscosity curve was again determined on the same sample after 24 hrs, and is shown as curve E in the figures.

Figure 2:
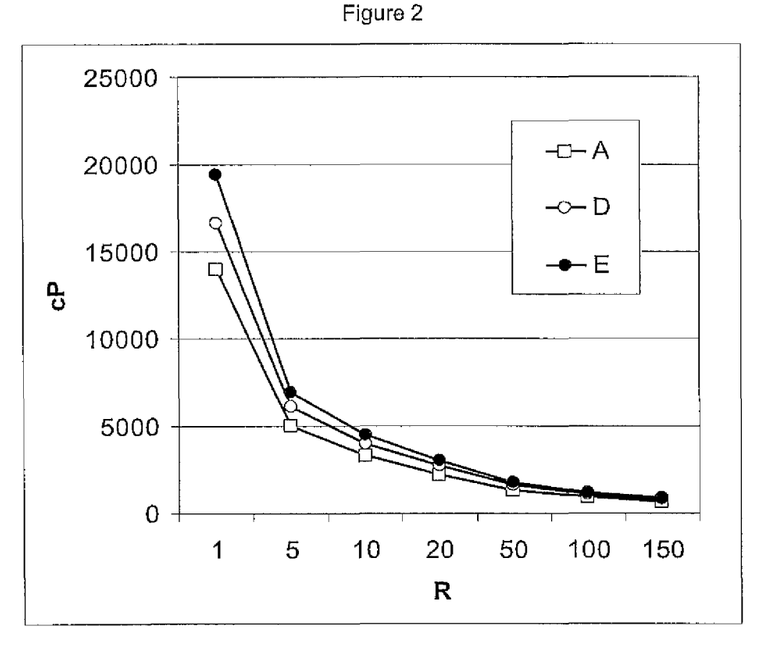

FIG. 2 compares the viscosity curves of the fresh carbomer-based adhesive A with the adhesives D and E which contain more gel but the same amount of starch. The higher concentration of carbomer gel leads to a higher viscosity at low shear. The viscosities at high shear are much closer. A small ageing effect may be observed by comparing curves D and E.

EXAMPLE 4

Carbomer-Based Adhesives F and G

Wheat starch (Mylbond 210 as in Example 1) (220 grams) was mixed into 700 grams of water and stirred for 120 seconds. 80 grams of the carbomer gel of Example 2 were introduced and further mixed during 120 seconds in order to obtain adhesive F. The adhesive composition F obtained had a dry solids content of 22% wt, a gel point of 56° C. and a Lorry cup viscosity at 27° C. of 30 seconds. The viscosity curve was determined as in Example 1 and is shown as curve F in the figures. The viscosity curve was again determined on the same sample after 24 hrs, and is shown as curve G in the figures.

Figure 3:
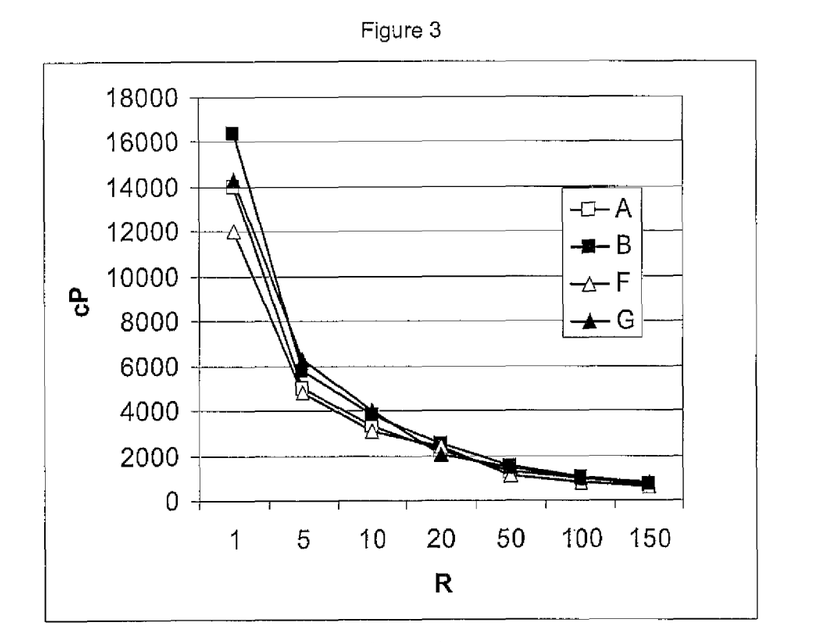

FIG. 3 compares the viscosity curves of the corn starch based adhesives A and B with the wheat starch based adhesives D and E which contain the same amount of the same gel. The viscosity curves are very close and have about the same shape.

EXAMPLE 5

Carbomer-Based Adhesive H

Native wheat flour (commercial bakery type) (260 grams) was mixed into 700 grams of water and stirred for 120 seconds. 40 grams of the carbomer gel of Example 2 were introduced and further mixed during 120 seconds in order to obtain adhesive H. The adhesive composition H obtained had a dry solids content of 27% wt, a gel point of 56° C. and a Lorry cup viscosity at 28° C. of 34 seconds. The viscosity curve was determined as in Example 1 and is shown as curve H in the figures.

Figure 4:
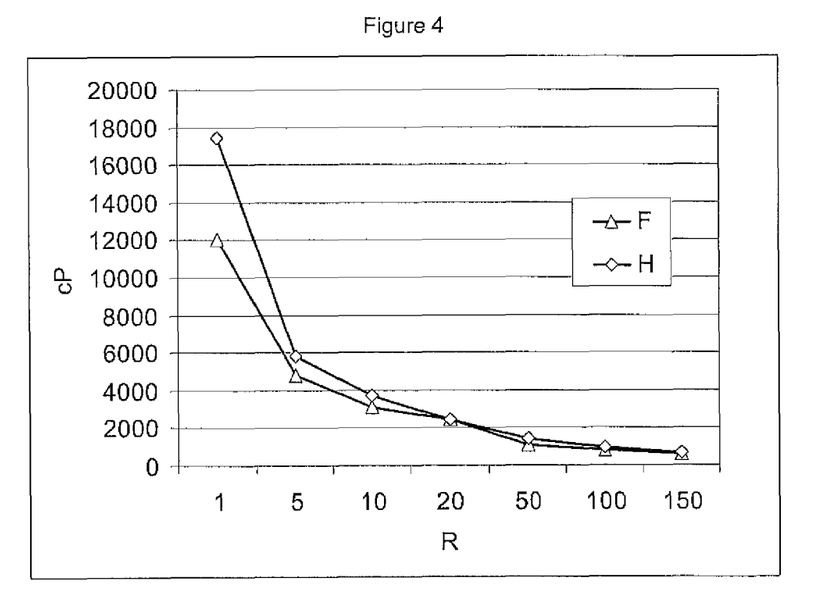

FIG. 4 compares the viscosity curves of the fresh wheat starch based adhesive F with the fresh wheat flour based adhesive H. The flour based adhesive reaches a low shear viscosity which is higher than this of the wheat starch based adhesive, and this with only half the amount of gel. This effect is due to the fact that flour picks up water more easily than starch.

EXAMPLE 6

Carbomer-Based Dry Blend Based Adhesives

In a Kenwood household kitchen dryblender, a first dry blend was made by mixing 1000 grams of Mylbond 210 modified wheat starch from Syral SA with 12 grams of Carbopol 941 and 12 grams of granular sodium carbonate (Na$_2$CO$_3$.10H$_2$O), and this by mixing for 15 minutes.

An adhesive was made by mixing 220 grams of the first dry blend into 780 grams of water for 120 seconds to obtain adhesive K. The adhesive composition K obtained had a dry solids content of 22% wt, a gel point of 58° C. and a Lorry cup viscosity at 28° C. of 48 seconds.

A second dry blend was made in the same way, but now with only 10 grams of carbomer and also only 10 grams of the granular sodium carbonate.

An adhesive was made by mixing 220 grams of the second dry blend into 780 grams of water for 120 seconds to obtain adhesive L. The adhesive composition L obtained had a dry solids content of 20% wt, a gel point of 54° C. and a Lorry cup viscosity at 28° C. of 35 seconds.

Figure 5:
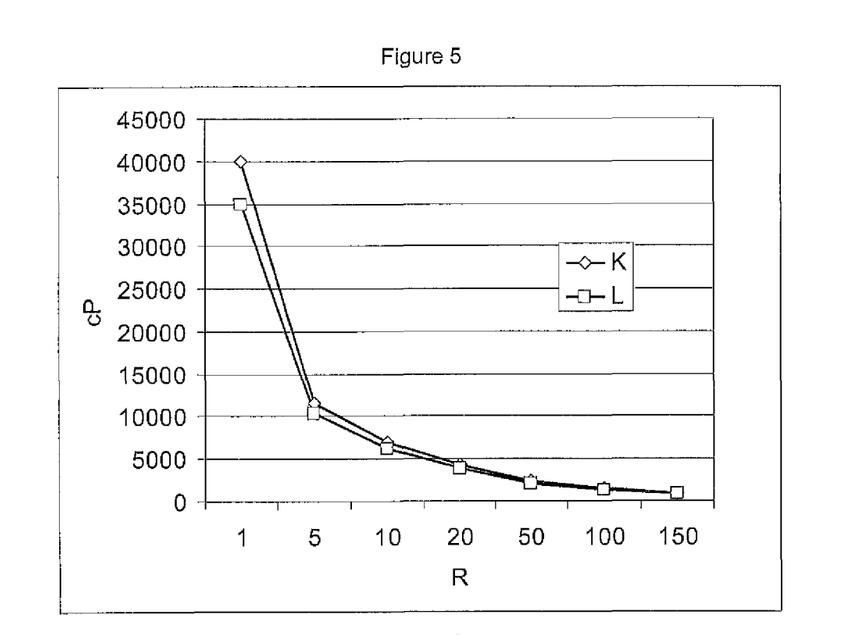

FIG. 5 shows the viscosity curves of the two adhesives K and L. A concentration effect of the carbomer concentration is noticeable.

EXAMPLE 7

Liquid Carbomer-Based Adhesive

The carbomer used in this example was Polygel W301 obtained from 3V Sigma. Polygel W301 may be described as a latex dispersion of cross-linked polyacrylic acid polymer in water, available as a milky liquid. When submitted to Gel Permeation Chromatography (GPC) dissolved in dimethylacetamide (DMA), the Polygel W301 gave a spectrum showing a broad peak in between a retention window of 21 to almost 30 minutes which provided the following molecular weight information relative to DMA and on an analytical system which is calibrated with polymethylmethacrylate reference standards: an Mn of 121674, an Mw of 171111, resulting in a polydispersity Mw/Mn of 1.41, an MP of 132934 at a retention time of about 25.5 minutes, an Mz of 244649 and an Mz+1 of 337451.

Liquid Carbomer-Based Adhesive Preparation

Figure 6:
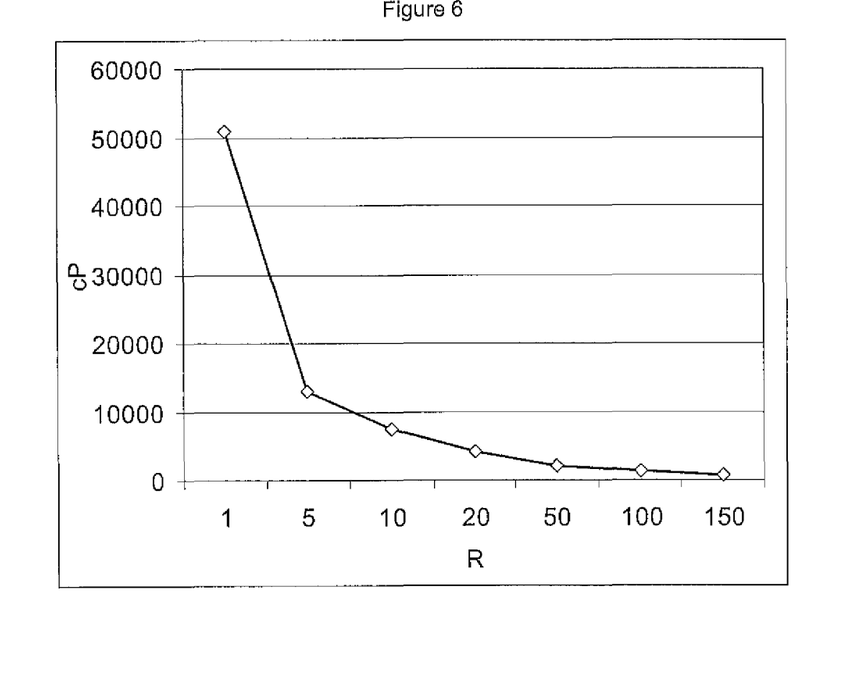

Mylbond 210 modified wheat starch from Syral SA (220 grams) were mixed into 780 grams of water. 14 grams of the Polygel W301 latex were introduced, as well as 3 grams of NaOH solution of 29% wt strength, and further mixed during 120 seconds in order to obtain the adhesive M. The adhesive composition obtained had a dry solids content of 22% wt, a gel point of 56° C. and a Lorry cup viscosity at 26° C. of 35 seconds. The viscosity curve was determined as in Example 1 and is shown in FIG. 6. The viscosity curve is very similar to those of the other carbomer-based adhesives.

The results of all the Brookfield viscosity measurements in the Examples are summarised in Table 1. All data are expressed in centiPoise (mPa·s) against rotations per minute for the spindle speed.

TABLE 1

| Adhesive | SPINDLE SPEED (rpm) | | | | | | | Ratio '1'/'150' |
|---|---|---|---|---|---|---|---|---|
| | 1 | 5 | 10 | 20 | 50 | 100 | 150 | |
| C | 3300 | 3200 | 2800 | 2100 | 1400 | 940 | 670 | 4.93 |
| A | 14000 | 5000 | 3300 | 2200 | 1300 | 970 | 690 | 20.29 |
| B | 16400 | 5800 | 3800 | 2500 | 1540 | 1070 | 755 | 21.72 |
| D | 16600 | 6100 | 4000 | 2700 | 1600 | 1100 | 845 | 19.64 |
| E | 19400 | 6900 | 4500 | 3000 | 1800 | 1200 | 900 | 21.56 |
| F | 12000 | 4800 | 3100 | 2400 | 1100 | 790 | 620 | 19.35 |
| G | 14300 | 6300 | 4000 | 2060 | 1500 | 1000 | 810 | 17.65 |
| H | 17400 | 5800 | 3700 | 2400 | 1400 | 960 | 660 | 26.36 |
| k | 40000 | 11480 | 6900 | 4300 | 2300 | 1500 | 950 | 42.11 |
| L | 35000 | 10300 | 6200 | 3800 | 2100 | 1300 | 900 | 38.89 |
| M | 50800 | 13000 | 7400 | 4200 | 2100 | 1300 | 850 | 59.76 |

The last column in Table 1 shows the calculated ratio of the viscosity measured at a spindle speed of 1 rpm (low shear) divided by the viscosity measured at a spindle speed of 150 rpm (high shear). All the carbomer containing adhesives prepared in the examples are characterised by this ratio being at least 5.00, and preferably much higher, such as at least 10, at least 15 or even at least 17. The higher this ratio, the better the difference in behaviour of the adhesive between where it is applied to the applicator roll by means of a knife or a doctor roll and where it is applied to the tips of the corrugations, as compared to where the corrugations separate from the applicator roll, and thus where the occurrence of spinning and other undesired phenomena may be minimized or avoided.

EXAMPLE 8

Cold Adhesive Composition

In an IKA magic LAB High Shear Mixer 8 grams of Carbopol 941 powder and 40 g of Carbobond 26373 acrylate emulsion were mixed into 350 grams of water. The pH of the mixture was not neutralised.

Into this mixture, 200 grams of polyvinyl alcohol dispersion and 400 g of calcium carbonate powder were mixed, together forming the adhesive composition according to the following overall recipe (parts by weight):

| | | | |
|---|---|---|---|
| Carbomer additive (as powder) | 8 | | |
| Polyvinyl alcohol (PVA as dispersion) | 200 | | |
| Carbobond 26373 (as dispersion) | 40 | | |
| CaCO3 | 400 | | |
| Water | 350 | | |

The Carbobond 26373 is a polyacrylate emulsion adhesion promoter which was obtained as a 58% wt acrylate dispersion in water from Lubrizol. The polyvinyl alcohol was obtained as a 30% wt dispersion in water, under the tradename POVAL from Kuraray. The calcium carbonate filler was obtained as a dry powder from Omya.

The adhesive composition such obtained was found to have excellent adhesive properties, although it only contained 6.01% wt of PVA adhesive component and 2.32% wt of adhesion promoter, i.e. together 8.34% wt of total adhesive components. It had a total dry solids content of 49.22% wt, but was nevertheless found to have acceptable stability.

The composition showed a much higher effect of shear stress on viscosity, as compared to the same composition without the carbomer.

EXAMPLE 9

Dextrine Adhesive Composition

Carbomer Gel Preparation
In an IKA magic LAB High Shear Mixer 20 grams of Carbopol 941 powder was mixed into 1000 grams of water. The pH of the mixture was not neutralised.
Dextrine Adhesive Composition Preparation
The gel was used to prepare a dextrine based adhesive composition according to the following overall recipe (parts by weight):

| | | | |
|---|---|---|---|
| Carbomer gel | 200 | 300 | 400 |
| In which Carbopol 941 | 4 | 6 | 8 |
| Yellow dextrine | 1000 | 1000 | 1000 |
| CaCO3 | 2000 | 2000 | 2000 |
| Extra water added | 1804 | 1706 | 1608 |
| Total water | 2000 | 2000 | 2000 |
| Total Dry Solid Matter | 60.0% | 60.0% | 60.1% |

The adhesive compositions such obtained had a very high total dry solid matter content, yet were found to have sufficient stability. The compositions were considered to be very suitable for tube winding, as adhesives for postage stamps, paper envelopes, paper bags, for lamination purposes, and for bottle labels such as beer bottles or wine bottles.

Having now fully described this invention, it will be appreciated by those skilled in the art that the invention can be performed within a wide range of parameters within what is claimed, without departing from the spirit and scope of the invention. As understood by those of skill in the art, the overall invention, as defined by the claims, encompasses other preferred embodiments not specifically enumerated herein.

The invention claimed is:

1. An aqueous adhesive composition comprising at least 7% and at most 30% by weight, based on the total adhesive composition, of adhesive component, the adhesive component comprising at least one component selected from the group consisting of a polyvinyl alcohol, a dextrin, a starch, and mixtures thereof, the adhesive composition further comprising a carbomer and optionally a boron compound, whereby the carbomer is cross-linked, whereby the adhesive composition has a pH of at most 13.0 and whereby, if starch and the boron compound are present in the adhesive composition, more than 91.0% of all the starches in the composition are in a cold water insoluble form.

2. The composition according to claim 1 further comprising a component selected from the group consisting of carboxy methyl cellulose (CMC), xanthan gum, and mixtures thereof.

3. The composition according to claim 1 having at least one of the following characteristics:
   (i) a gelation point of at most 70° C.,
   (ii) a refractometer reading in % Brix of at most 15%,
   (iii) a Brookfield viscosity at 25° C. in the range of 500 to 5000 mPa·s, as measured on a Brookfield RV apparatus with spindle 4 on a speed of 150 rpm for the fresh adhesive composition, and
   (iv) a ratio of the viscosity measured as under (iii) at a spindle speed of 1 rpm divided by the viscosity measured at a spindle speed of 150 rpm of at least 5.00.

4. The composition according to claim 1 which is substantially free of boron.

5. The composition according to claim 4 which is substantially free of free NaOH.

6. The composition according to claim 1 which is substantially free of a boron-containing compound.

7. The composition according to claim 6 which is substantially free of free NaOH.

8. The composition according to claim 1 which is substantially free of free NaOH.

9. The composition according to claim 1 further containing a boron-containing compound.

10. The composition according to claim 9 wherein the boron-containing compound is selected from the group consisting of boric acid, a sodium polyborate in its hydrated form, a sodium polyborate in its unhydrated form, a potassium polyborate in its hydrated form, a potassium polyborate in its unhydrated form, boric anhydride, sodium metaborate, potassium metaborate, and mixtures thereof.

11. The composition according to claim 10 wherein the boron-containing compound is selected from the group consisting of sodium tetraborate, sodium pentaborate, sodium octaborate, and mixtures thereof.

12. The composition according to claim 11 wherein the boron-containing compound is sodium tetraborate decahydrate (borax).

13. The composition according to claim 1 further containing at least one ingredient selected from the group consisting of an adhesion promoter, a surface tension agent, an antifoam agent, a descaling agent, an optical clarification agent, a fungicide, a bactericide, a colorant, a wetting agent, a viscosity modifier, a rheology modifier, an antifreeze, a solvent, and mixtures thereof.

14. The composition according to claim 1 wherein at least part of any of the starches is present as flour.

15. A solid dry premix composition comprising (i) at least one adhesive component selected from the group consisting of a polyvinyl alcohol, a dextrin and a starch, and mixtures thereof, (ii) a carbomer and (iii) a base, and optionally a boron compound, whereby the carbomer is cross-linked, and whereby, if starch and the boron compound are present in the composition, more than 91.0% of all the starches in the composition are in a cold water insoluble form.

16. The solid dry premix composition according to claim 15 wherein the base is selected from the group consisting of sodium carbonate, sodium bicarbonate, and mixtures thereof.

17. The composition according claim 15 further containing one or more ingredients selected from the group consisting of an adhesion promoter, a surface tension agent, an antifoam agent, a descaling agent, an optical clarification agent, a fungicide, a bactericide, a colorant, a wetting agent, a viscosity modifier, a rheology modifier, an antifreeze, a solvent, and mixtures thereof.

18. The composition according to claim 15 wherein at least part of any of the starches is present as flour.

19. A method for the production of an aqueous adhesive composition according to claim 1, the method comprising the formation of at least one carrier by employing at least one of the steps a), b) and c), whereby
   a) step a) comprises forming a first carrier by mixing a primary amount of starch into a primary amount of water and at least partly gelatinizing this primary starch by means of the addition of at least one selected from heat, a base, and combinations thereof,
   b) step b) comprises dissolving the carbomer in a secondary amount of water to form a second carrier,
   c) step c) comprises neutralizing, in the absence of any starch, the second carrier from step b) to the desired pH by mixing in a base to form a third carrier,
   the method further comprising step d), whereby
   d) step d) comprises mixing a tertiary amount of water, the adhesive component, and any further ingredient as required, into a carrier selected from the group consisting of the first carrier from step a), the second carrier from step b), and the third carrier from step c), and combinations thereof, as required to form the aqueous adhesive composition.

20. The method according to claim 19 whereby in at least one step selected from the group consisting of step a), step b), step c) and step d), at least one further ingredient is mixed in, which further ingredient is selected from the group consisting of a boron-containing compound, carboxy methyl cellulose (CMC), xanthan gum, an adhesion promoter, an optical clarification agent, a surface tension agent, an antifoam agent, a descaling agent, a fungicide, a bactericide, a colorant, a wetting agent, a viscosity modifier, a rheology modifier, an antifreeze, a solvent, and mixtures thereof.

21. The method according to claim 19 further comprising the step e) of evaporating water to obtain a dry powder which is a solid dry premix composition.

22. The method according to claim 21 further comprising employing the solid dry premix composition of step e) to form an adhesive bond with a substrate to form an article comprising the substrate and the adhesive bond.

23. The method according to claim 22 wherein the article is selected from the group consisting of laminated non-corrugated paper, laminated non-corrugated card board, laminated corrugated paper, laminated corrugated card board, cardboard, corrugated cardboard, a container comprising cardboard, a container comprising corrugated cardboard, a packaging container comprising cardboard, and a packaging container comprising corrugated cardboard.

24. The method according to claim 23 wherein the article is in the form of an element selected from the group consisting of a tube and a wound tube.

25. The method according to claim 19 wherein at least part of any of the starches is introduced as flour.

26. The method according to claim 19 further comprising employing the aqueous adhesive composition of step d) to form an adhesive bond with a substrate to form an article comprising the substrate and the adhesive bond.

27. The method according to claim 26 wherein the article is selected from the group consisting of laminated non-corrugated paper, laminated non-corrugated card board, laminated corrugated paper, laminated corrugated card board, cardboard, corrugated cardboard, a container comprising cardboard, a container comprising corrugated cardboard, a packaging container comprising cardboard, and a packaging container comprising corrugated cardboard.

28. The method according to claim 27 wherein the article is in the form of an element selected from the group consisting of a tube and a wound tube.

29. A method for the production of a solid dry premix composition according to claim 15 comprising dry blending the adhesive component, the carbomer, optionally sufficient base, and any further ingredient as desired to obtain the desired solid dry premix composition.

30. The method according to claim 29 wherein at least part of any of the starches is introduced as flour.

31. The method according to claim 29 further comprising employing the solid dry premix composition to form an adhesive bond with a substrate to form an article comprising the substrate and the adhesive bond.

32. The method according to claim 31 wherein the article is selected from the group consisting of laminated non-corrugated paper, laminated non-corrugated card board, laminated corrugated paper, laminated corrugated card board, cardboard, corrugated cardboard, a container comprising cardboard, a container comprising corrugated cardboard, a packaging container comprising cardboard, and a packaging container comprising corrugated cardboard.

33. The method according to claim 32 wherein the article is in the form of an element selected from the group consisting of a tube and a wound tube.

* * * * *